United States Patent
Criswell

(10) Patent No.: US 10,246,278 B1
(45) Date of Patent: Apr. 2, 2019

(54) AUTOMATIC TIRE LOADER/UNLOADER FOR STACKING/UNSTACKING TIRES IN A TRAILER

(71) Applicants: Wynright Corporation, Elk Grove, IL (US); Daifuku Co., Ltd., Osaka (JP)

(72) Inventor: Tim Criswell, Arlington, TX (US)

(73) Assignees: Wynright Corporation, Elk Grove, IL (US); Daifuku Co., Ltd. (JP)

( * ) Notice: Subject to any disclaimer, the term of this patent is extended or adjusted under 35 U.S.C. 154(b) by 0 days.

(21) Appl. No.: 16/115,327

(22) Filed: Aug. 28, 2018

Related U.S. Application Data

(63) Continuation of application No. 15/850,887, filed on Dec. 21, 2017, now Pat. No. 10,059,537, which is a continuation of application No. 15/646,348, filed on Jul. 11, 2017, now Pat. No. 9,850,081, which is a continuation of application No. 15/263,849, filed on
(Continued)

(51) Int. Cl.
| | |
|---|---|
| *B65G 67/02* | (2006.01) |
| *B65G 61/00* | (2006.01) |
| *B65G 21/14* | (2006.01) |
| *B25J 5/00* | (2006.01) |
| *B65G 67/08* | (2006.01) |
| *B65G 57/20* | (2006.01) |
| *B25J 15/00* | (2006.01) |

(52) U.S. Cl.
CPC .............. *B65G 67/02* (2013.01); *B25J 5/005* (2013.01); *B25J 5/007* (2013.01); *B25J 15/00* (2013.01); *B65G 21/14* (2013.01); *B65G 57/20* (2013.01); *B65G 61/00* (2013.01); *B65G 67/08* (2013.01); *B65G 2201/0273* (2013.01)

(58) Field of Classification Search
CPC combination set(s) only.
See application file for complete search history.

(56) References Cited

U.S. PATENT DOCUMENTS

| | | |
|---|---|---|
| RE33,416 E | 10/1990 | Konishi et al. |
| 5,249,131 A | 9/1993 | Kato |
| | (Continued) | |

OTHER PUBLICATIONS

International Search Report, PCT/US2014/011743, dated May 12, 2014.

*Primary Examiner* — Kyle O Logan
(74) *Attorney, Agent, or Firm* — Scott T. Griggs; Griggs Bergen LLP

(57) ABSTRACT

An automatic tire loader/unloader for stacking/unstacking tires in a trailer is disclosed. In one embodiment, a mobile base structure provides a support framework for a drive subassembly, conveyance subassembly, an industrial robot, a distance measurement subassembly, and a control subassembly. Under the operation of the control subassembly, tires advance through a powered transportation path to an industrial robot which places the tires within the trailer in a vertical stacking pattern or a rick-stacking pattern, for example. The control subassembly coordinates the selective articulated movement of the industrial robot and the activation of the drive subassembly based upon the distance measurement subassembly detecting objects, including tires, within a detection space, dimensions of the trailer provided to the control subassembly, and dimensions of the tires provided to the control subassembly.

20 Claims, 17 Drawing Sheets

Related U.S. Application Data

Sep. 13, 2016, now Pat. No. 9,701,491, which is a continuation of application No. 14/156,399, filed on Jan. 15, 2014, now Pat. No. 9,440,349.

(60) Provisional application No. 61/752,714, filed on Jan. 15, 2013.

(56) References Cited

U.S. PATENT DOCUMENTS

| | | |
|---|---|---|
| 5,697,294 A | 12/1997 | Keller et al. |
| 6,055,462 A | 4/2000 | Sato |
| 6,273,670 B1 | 8/2001 | Henson et al. |
| 6,654,666 B1 | 11/2003 | Terada |
| 6,721,762 B1 | 4/2004 | Levine et al. |
| 7,061,508 B1 | 6/2006 | Noguchi et al. |
| 7,369,976 B1 | 5/2008 | Nakajima |
| 7,699,087 B2 | 4/2010 | Rogalla et al. |
| 8,244,400 B2 | 8/2012 | Cottone et al. |
| 9,440,349 B2 | 9/2016 | Criswell |
| 9,701,491 B2 | 7/2017 | Criswell |
| 9,850,081 B1 | 12/2017 | Criswell |
| 10,059,537 B2 | 8/2018 | Criswell |
| 2001/0028838 A1* | 10/2001 | Leimbach .......... B29D 30/0016 414/788 |
| 2004/0006408 A1 | 1/2004 | Kakutani et al. |
| 2004/0044504 A1 | 3/2004 | Shimizu |
| 2004/0068391 A1 | 4/2004 | Futamura et al. |
| 2004/0165980 A1 | 8/2004 | Huang et al. |
| 2006/0106487 A1 | 5/2006 | Allen et al. |
| 2009/0110522 A1* | 4/2009 | Criswell ................ B65G 67/08 414/398 |
| 2009/0306812 A1* | 12/2009 | Cottone ................ B65G 57/03 700/217 |

* cited by examiner

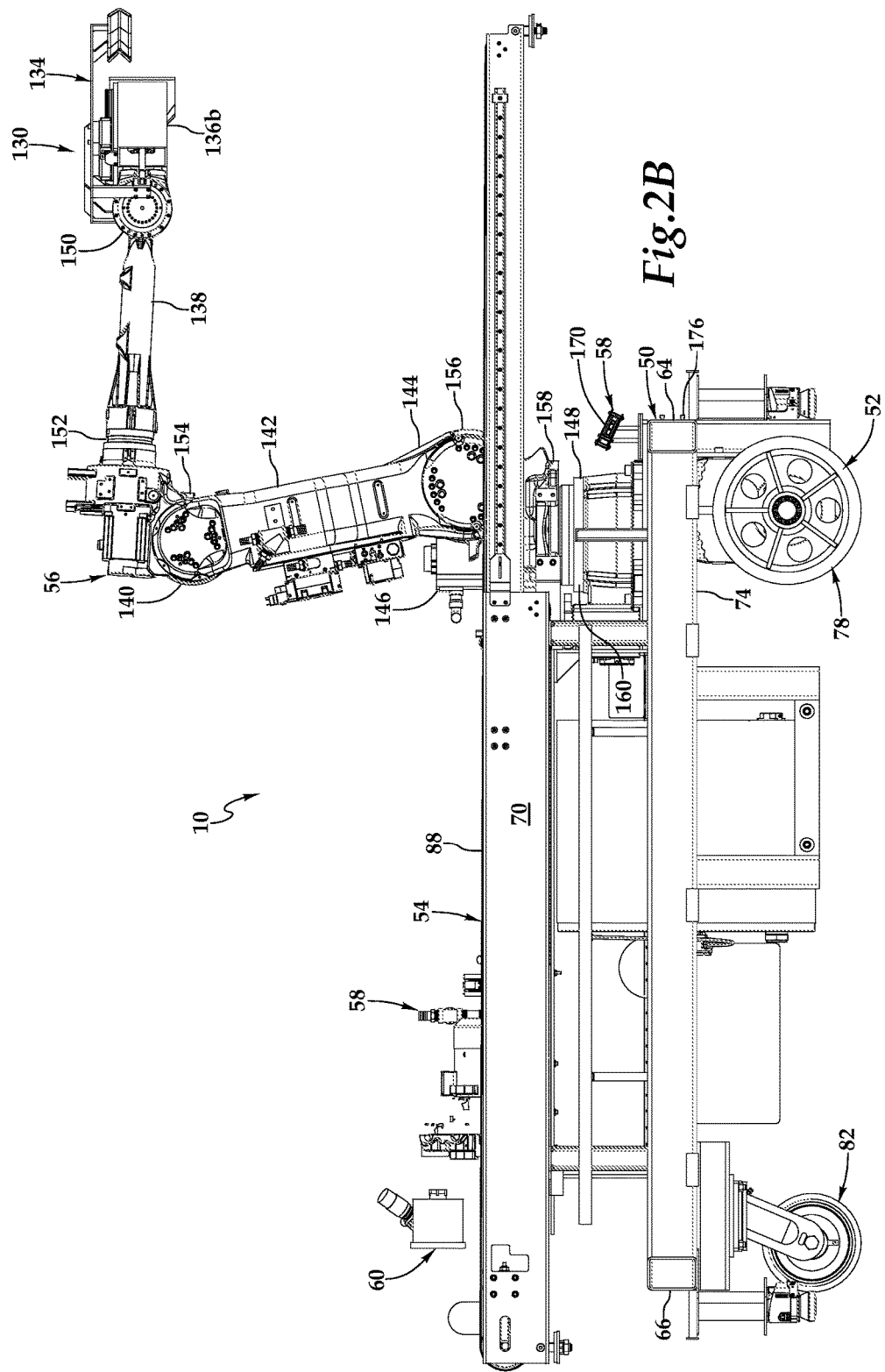

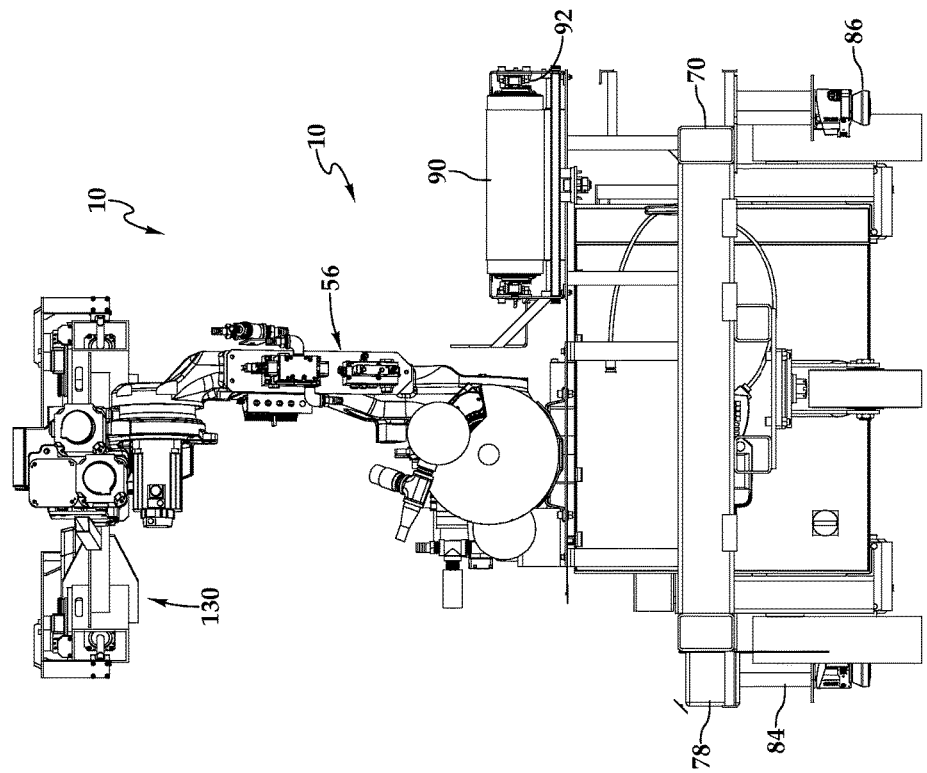
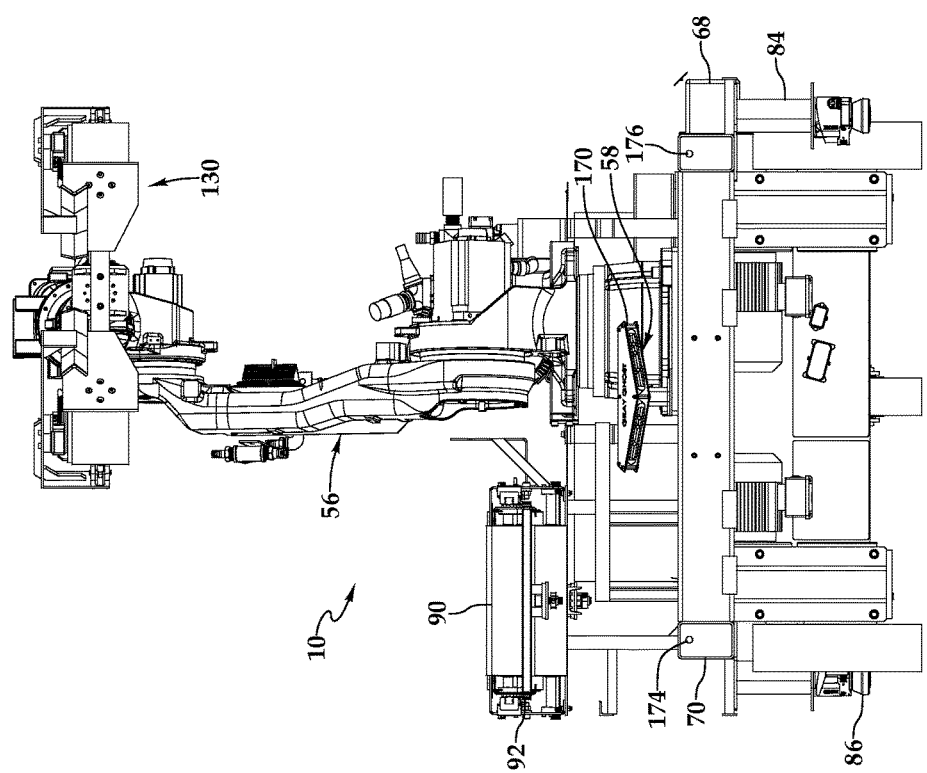

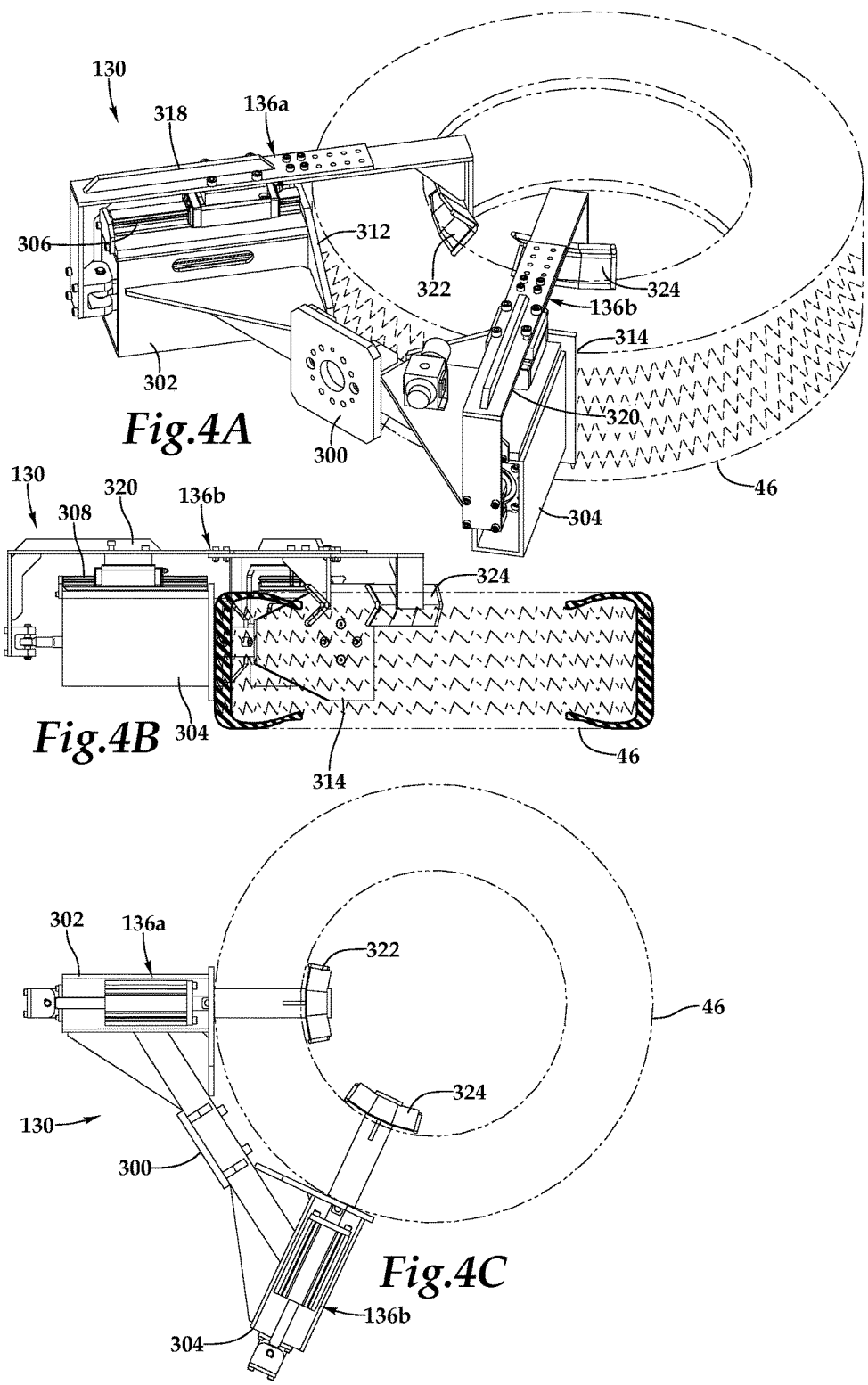

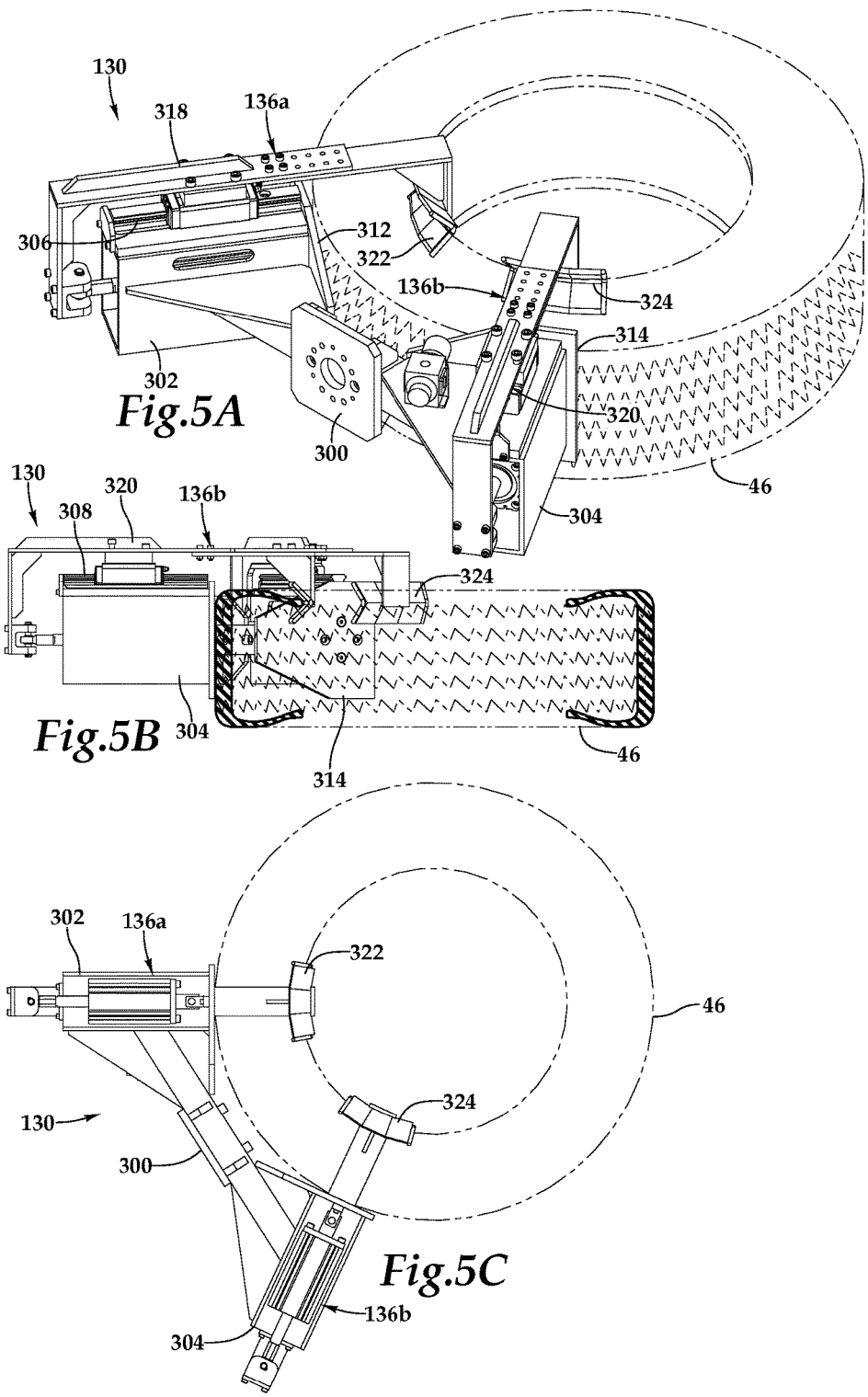

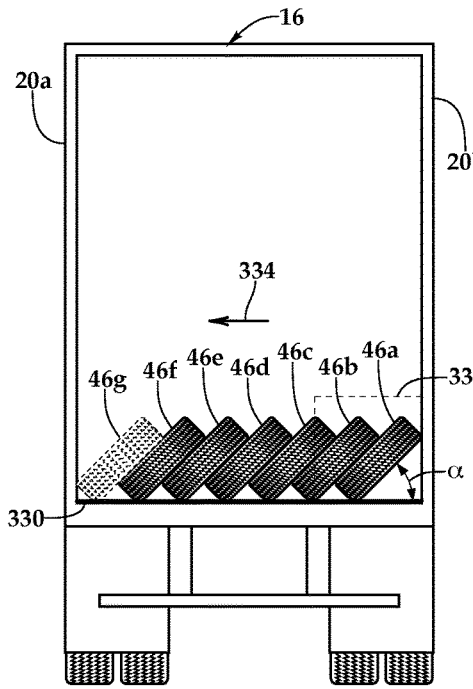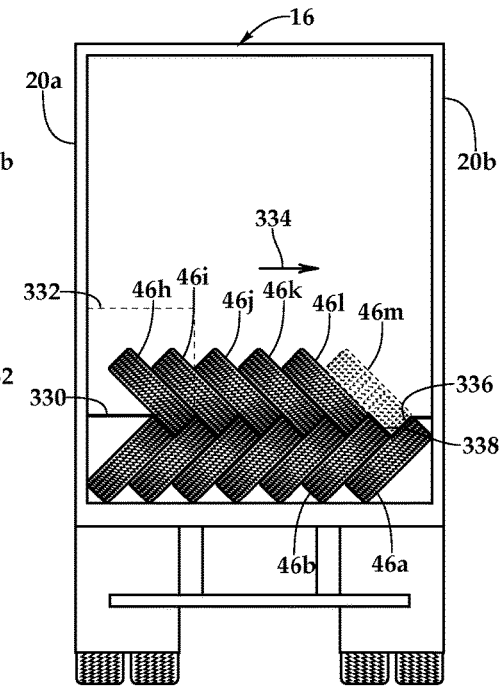
Fig.6A  Fig.6B
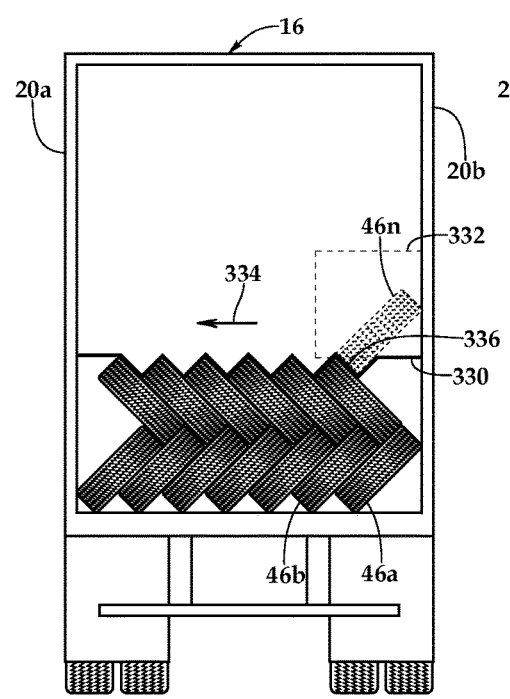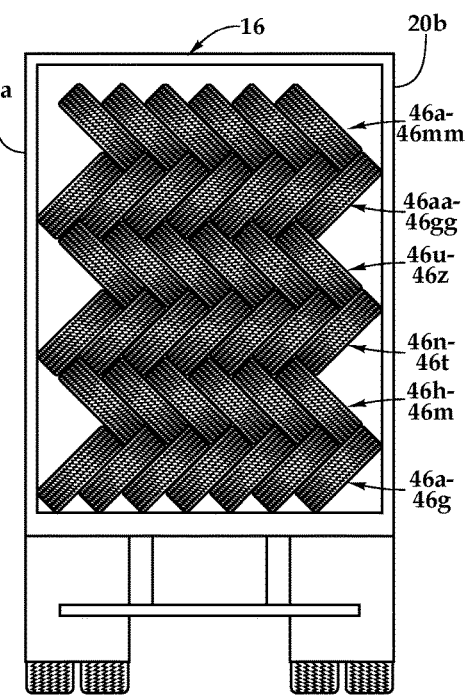
Fig.6C  Fig.6D

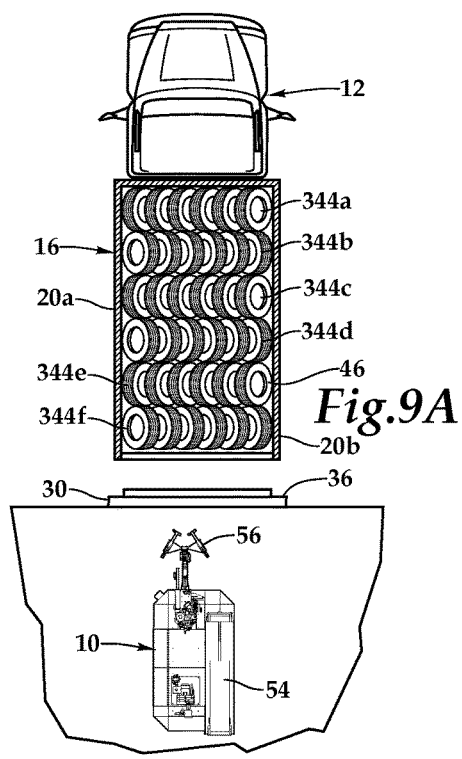
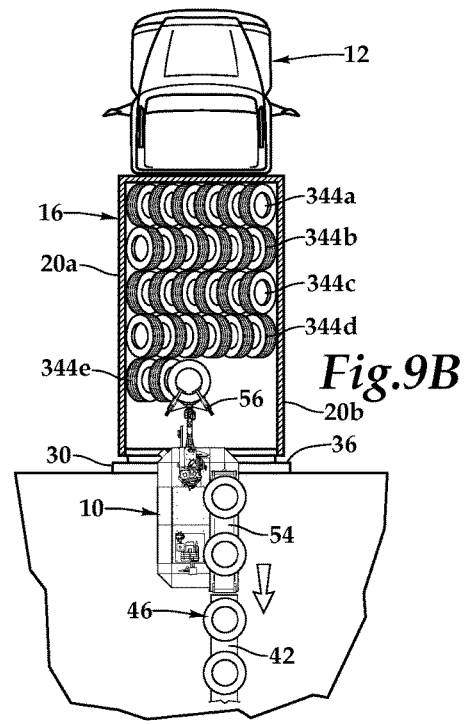
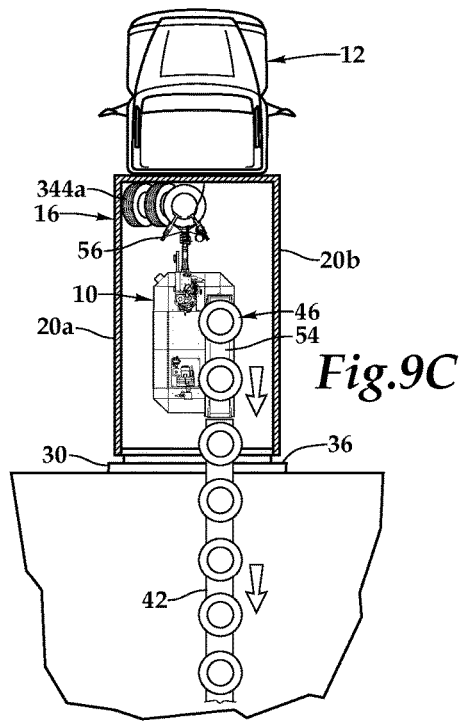
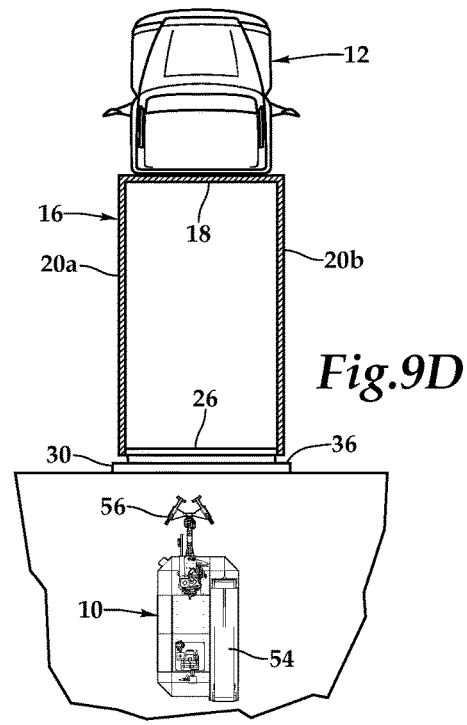

US 10,246,278 B1

AUTOMATIC TIRE LOADER/UNLOADER FOR STACKING/UNSTACKING TIRES IN A TRAILER

PRIORITY STATEMENT & CROSS-REFERENCE TO RELATED APPLICATIONS

This application is a continuation of U.S. patent application Ser. No. 15/850,887, entitled "Automatic Tire Loader/Unloader for Stacking/Unstacking Tires in a Trailer," filed on Dec. 21, 2017, in the name of Tim Criswell, now U.S. Pat. No. 10,059,537, and issued on Aug. 28, 2018; which is a continuation of U.S. patent application Ser. No. 15/646,348, entitled "Automatic Tire Loader/Unloader for Stacking/Unstacking Tires in a Trailer," filed on Jul. 11, 2017, in the name of Tim Criswell, now U.S. Pat. No. 9,850,081, and issued on Dec. 26, 2017; which is a continuation of U.S. patent application Ser. No. 15/263,849, entitled "Automatic Tire Loader/Unloader for Stacking/Unstacking Tires in a Trailer," filed on Sep. 13, 2016, in the name of Tim Criswell, now U.S. Pat. No. 9,701,491, and issued on Jul. 11, 2017; which is a continuation of U.S. patent application Ser. No. 14/156,399, entitled "Automatic Tire Loader/Unloader for Stacking/Unstacking Tires in a Trailer," filed on Jan. 15, 2014, in the name of Tim Criswell, now U.S. Pat. No. 9,440,349 issued on Sep. 13, 2016; which claims priority from U.S. Patent Application No. 61/752,714, entitled "Automatic Tire Loader/Unloader for Stacking/Unstacking Tires in a Trailer," and filed on Jan. 15, 2013, in the name of Tim Criswell; all of which are hereby incorporated by reference for all purposes.

TECHNICAL FIELD OF THE INVENTION

This invention relates, in general, to a machine for handling products and, more particularly, to a system and method for automated truck loading and unloading which employ an automatic tire loader/unloader designed to stack tires within a trailer or remove tires from a trailer.

BACKGROUND OF THE INVENTION

Loading docks and loading bays are commonly found in large commercial and industrial buildings and provide arrival and departure points for large shipments brought to or taken away by trucks and vans. By way of example, a truck may back into a loading bay such that the bumpers of the loading bay contact the bumpers on the trailer and a gap is created between the loading bay and the truck. A dock leveler or dock plate bridges the gap between the truck and a warehouse to provide a fixed and substantially level surface. Power moving equipment, such as forklifts or conveyor belts, is then utilized to transport the cargo from the warehouse to the truck. Human labor is then employed to stack the cargo in the truck. This is particularly true of the stacking and unstacking of tires during the respective loading and unloading of the truck. These systems are designed to maximize the amount the cargo loaded while minimizing the use of human labor to both protect and extend the life of the workforce. A need still exists, however, for improved truck loading systems that further reduce the use of human labor when stacking and unstacking tires as part of loading and unloading a truck.

SUMMARY OF THE INVENTION

It would be advantageous to achieve a system and method for automated stacking and unstacking of tires that would enable a truck to be fully loaded and unloaded using minimal or no human labor, thereby minimizing the time to load/unload the truck and the need for human capital. It would also be desirable to enable a robotic solution that would address this problem by stacking and unstacking tires using a rick-rack pattern, which is optimal for tire loading/unloading. To better address one or more of these concerns, an automatic tire loader/unloader for stacking/unstacking tires in a trailer is disclosed. In one embodiment, a mobile base structure provides a support framework for a drive subassembly, conveyance subassembly, an industrial robot, a distance measurement subassembly such as a three dimensional camera system, and a control subassembly. Under the operation of the control subassembly, tires advance through a powered transportation path to an industrial robot which places the tires within the trailer in a vertical stacking pattern or a rick-stacking pattern, for example. The control subassembly coordinates the selective articulated movement of the industrial robot and the activation of the drive subassembly based upon the distance measurement subassembly detecting objects, including tires, within a detection space, dimensions of the trailer provided to the control subassembly, and dimensions of the tires provided to the control subassembly. These systems and methodologies utilizing the present automatic tire loader therefore maximize the amount the product and cargo loaded while minimizing the use of human labor to both protect and extend the life of the workforce. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 2B is a side elevation view of the automatic tire loader illustrated in FIG. 1;

FIG. 2D is a front elevation view of the automatic tire loader illustrated in FIG. 1;

FIG. 2E is a rear elevation view of the automatic tire loader illustrated in FIG. 1;

FIG. 4A is a perspective view of one embodiment of an end effector, which forms a portion of the automatic tire loader, being posited to grip a tire;

FIG. 4B is a side elevation view of the end effector in FIG. 4A;

FIG. 4C is a top plan view of the end effector in FIG. 4A;

FIG. 5A is a perspective view of one embodiment of an end effector, which forms a portion of the automatic tire loader, gripping a tire;

FIG. 5B is a side elevation view of the end effector in FIG. 5A;

FIG. 5C is a top plan view of the end effector in FIG. 5A;

FIGS. 6A through 6D are schematic diagrams of one operational embodiment of the automatic tire loader of FIG. 1 stacking tires in the trailer of the truck;

FIGS. 9A through 9D are top plan views of an operational embodiment corresponding to FIGS. 7A through 7D;

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1:
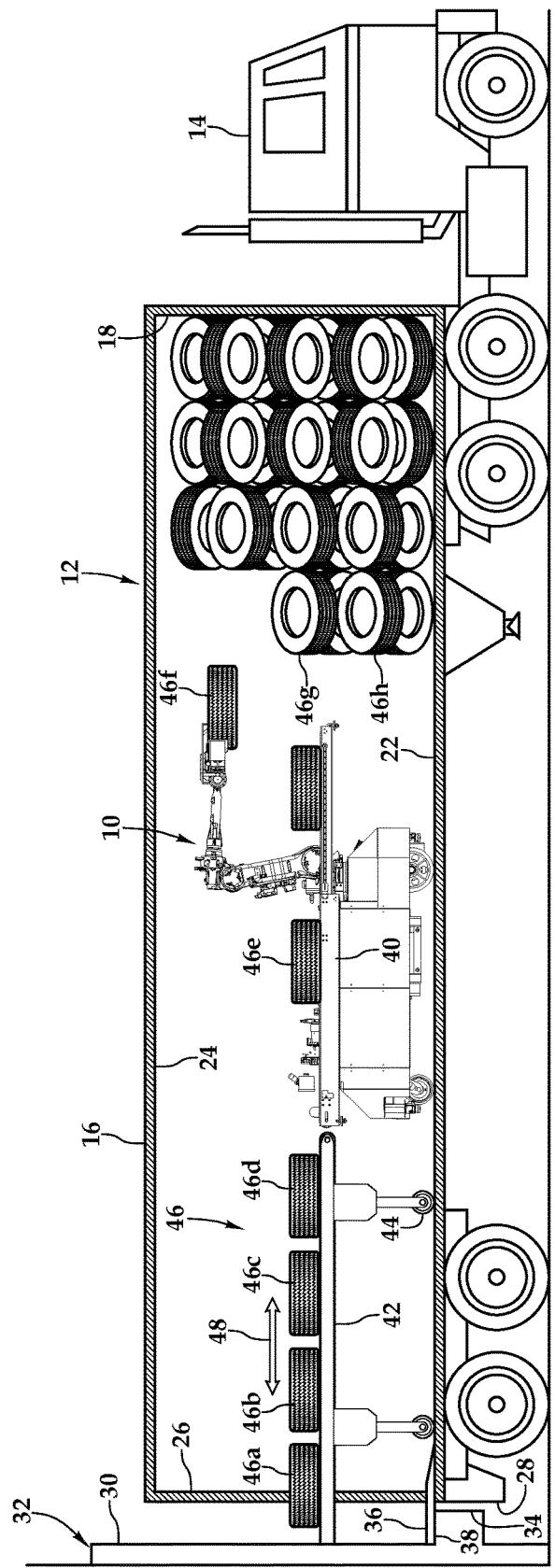
FIG. 1 is a side elevational view with partial cross-section of one embodiment of an automatic tire loader/unloader positioning tires within a trailer of a truck.

Referring initially to FIG. 1, therein is depicted an automatic tire loader/unloader that is schematically illustrated and generally designated 10 and may be referred to as the automatic tire loader. This automatic tire loader 10 is utilized in systems and methods for automated truck loading. A tractor trailer, for example, 12 having an operator cab 14 is towing a trailer 16, which may be an ocean freight container, for example, having a front wall 18, two side walls 20A, 20B (best seen in FIGS. 6A through 6D, for example), a floor 22, a ceiling 24, and a rear access opening 26 accessible due to an open door. As alluded to, as used herein, trailer includes ocean freight containers and similar transport and logistic structures. A bumper 28 of the trailer 16 is backed up to a loading bay 30 of loading dock 32 such that the bumper 28 touches a bumper 34 of the loading bay 30. A dock plate 36 bridges the gap between the floor 22 and a deck 38 of the loading dock 32.

As will be described in further detail hereinbelow, under the supervision of the distance measurement subassembly that is a component of the automatic tire loader 10, the automatic tire loader 10 maneuvers and drives automatically into the trailer 16 to a position proximate to the front wall 18. It should be appreciated that although an operator is not depicted as operating the automatic tire loader 10, an operator may interact with the equipment, although unnecessary. The automatic tire loader 10 operates independently of an operator and an operator is only necessary for certain types of troubleshooting, maintenance, and the like. A telescoping conveyor unit 42 is connected to the automatic tire loader 10. A stream of product 46, in the form standard tires 46A-46H, which may be of any dimension, radius, and/or tread, is being supplied by the telescoping conveyor 42 which, in turn, loads the product 46 into the trailer 16. In particular, the automatic tire loader 10 has already stacked tires 46F, 46G and others, 46H, for example, at the intersection of the front wall and the floor 22. The automatic tire loader 10 alternates between loading the tires 46 and reversing to create more space for the tires 46 between the front wall 18 and the automatic tire loader 10 until the trailer 16 is at least partially loaded of tires 46.

FIG. 2A through FIG. 2G and FIG. 3A through FIG. 3B depict the automatic tire loader 10 in further detail. A mobile base 50 supports a drive subassembly 52, a conveyance subassembly 54, an industrial robot 56, a positioning subassembly 58, a safety subsystem 60, and a control subassembly 62, which interconnects the drive subassembly 52, conveyance subassembly 54, industrial robot 56, positioning subassembly 58, and safety subsystem 60. The mobile base 50 includes a front end 64 and a rear end 66 as well as sides 68, 70, a surface 72, and an undercarriage 74.

The drive subassembly 52 is coupled to the undercarriage 74 of the mobile base 50 to provide mobility. As will be discussed in further detail hereinbelow, drive wheel assemblies 78, 80, are disposed on the undercarriage 74 proximate to the sides 70, 68 respectively. A universal wheel assembly 82 is disposed on the undercarriage 74 more proximate to the rear end 66 and centered between the sides 68, 70, respectively. In combination, wheel assemblies 78, 80, 82 provide forward and reverse drive and steering. Retractable stabilization assemblies 84, 86 are also disposed on the undercarriage 74 proximate to the intersection of the end 64 and side 68, the intersection of end 66 and the side 70, respectively. As alluded to, in a forward or reverse drive and steering operation, such as moving into or out of the trailer 16, drive wheel assemblies 78, 80 and the universal wheel assembly 82 are actuated and in contact with the deck 38 of the loading dock 32 while the retractable stabilization assemblies 84, 86 are withdrawn from contact with the deck 38 in a position close to the undercarriage 74. On the other hand, when the automatic tire loader/unloader 10 is conducting a tire loading or unloading operation, such as during the use of the industrial robot 56, the retractable stabilization assemblies 84, 86 are positioned in contact with the deck 38 to anchor the automatic tire loader/unloader 10.

The conveyance subassembly 54 is disposed on the surface 72 of the mobile base 50 to provide a powered transportation path 88 operable for measuring, separating, carrying, and stacking, as required by the application and job assignment of the automatic tire loader/unloader 10, tires from the rear end 66 to the front end 64 proximate to the industrial robot 56. As shown, the powered transportation path 88 includes a powered roller conveyor 90 having roller elements 92 which deliver the tires 46 to a landing platform 94 where manipulation by the industrial robot 56 is initiated. It should be appreciated that although only a single powered roller conveyor 90 is display, the powered transportation path 88 may include any combination and type of conveyors, elevators, stackers, and bypasses and the particular combination of components selected for the powered transportation path 84 will depend upon the particular tires or other product and application of the automatic tire loader/unloader 10.

The conveyance subassembly 54 as well as the telescoping conveyor unit 42 may also each be equipped with a series of end stop photo eyes to adjust the rate of automatic flow of product through the telescoping conveyor unit 42 and the conveyance subassembly 54. Such an implementation provides a steady and continuous flow of product, maintains proper tire or product separation, and prevents unnecessary gaps between the product and product backups and jams.

A telescoping conveyor interface 104 couples the roller conveyor 90 of the conveyance subassembly 54 to the telescoping conveyor unit 42 and the rest of a pick belt system which may be at the warehouse associated with the loading dock 32. Auto-follow circuitry associated with the telescoping interface 104 of the telescoping conveyor unit 42 and the conveyance subassembly 54 may utilize fiber optic sensors at the last boom of the telescoping conveyor unit detect reflective tape at the edge of the conveyance subassembly to cause the telescoping conveyor unit 42 to extend and retract to maintain the proper position with respect to the automatic tire loader/unloader 10. In another embodiment, the telescoping conveyor unit 42 may be passive and other elements may provide the force required to extend or retract.

The industrial robot 56 is disposed at the front end 64 and adapted to provide selective articulated movement of an end effector 130 between the landing platform 94 of the powered transportation path 88 and a reachable space 132 such that the industrial robot 56 is operable to place the product 46 in the reachable space 132. The end effector 130 includes a gripper arm 134 adapted for manipulating product with opposing grapplers 136A, 136B. It should be appreciated that any type of end effector 130 may be employed the industrial robot and the choice of end effector 130 will depend upon the product 46 and specific automatic tire loader 10 application. By way of example, the gripper arm 134 with opposing grapplers 136A, 138B is preferred for loading tires 46A-46H. It should be understood, however, that the product 46 may be any type of good such as other non-tire objects requiring loading.

Figure 2A:
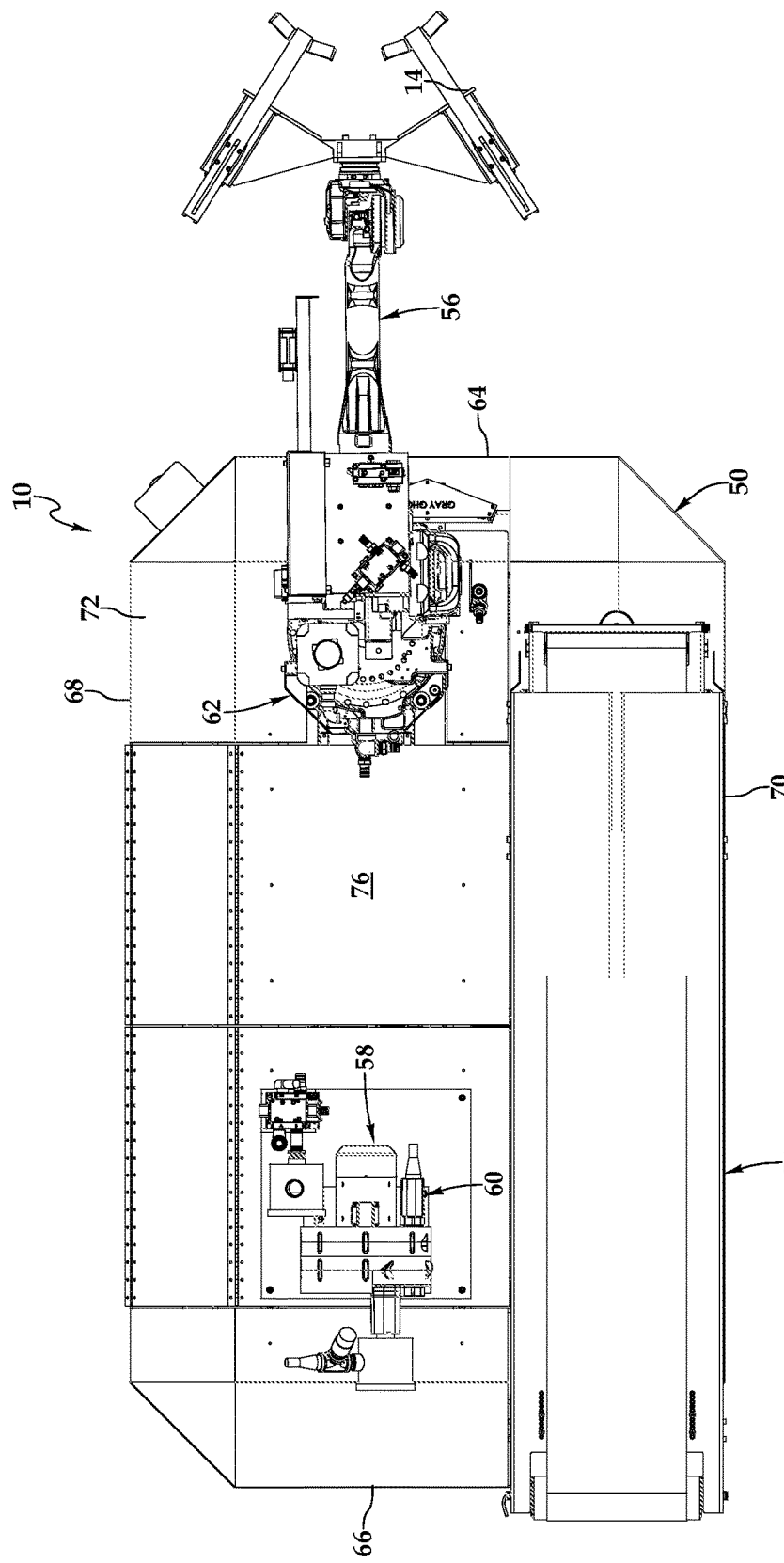
FIG. 2A is a top plan view of the automatic tire loader illustrated in FIG. 1.
Figure 2C:
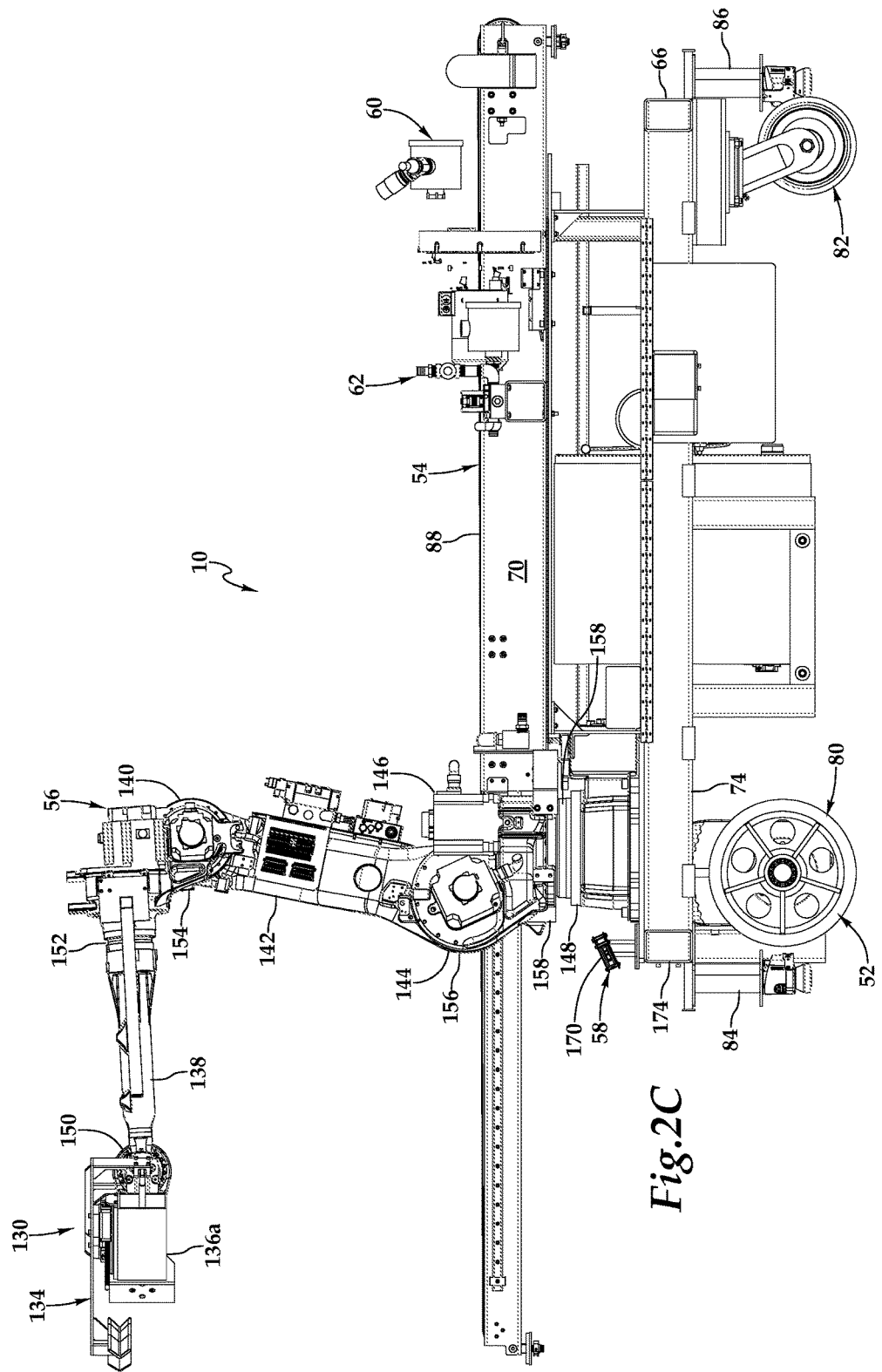
FIG. 2C is a second side elevation view of the automatic tire loader illustrated in FIG. 1.
Figure 2F:
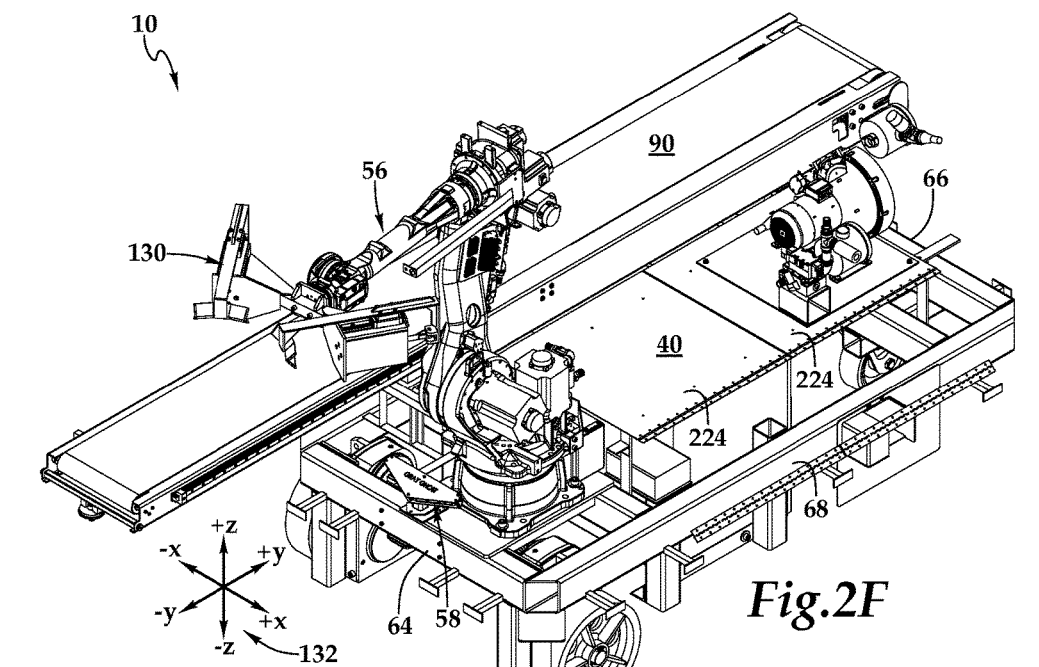
FIG. 2F is a front perspective view of the automatic tire loader illustrated in FIG. 1.
Figure 2G:
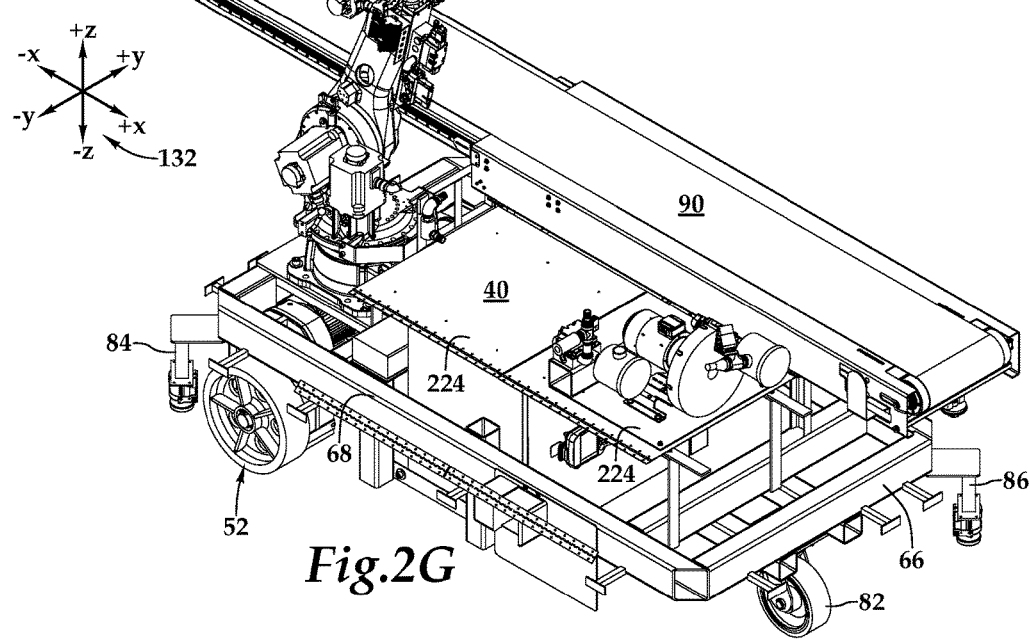
FIG. 2G is a rear perspective view of the automatic tire loader illustrated in FIG. 1.
Figure 3A:
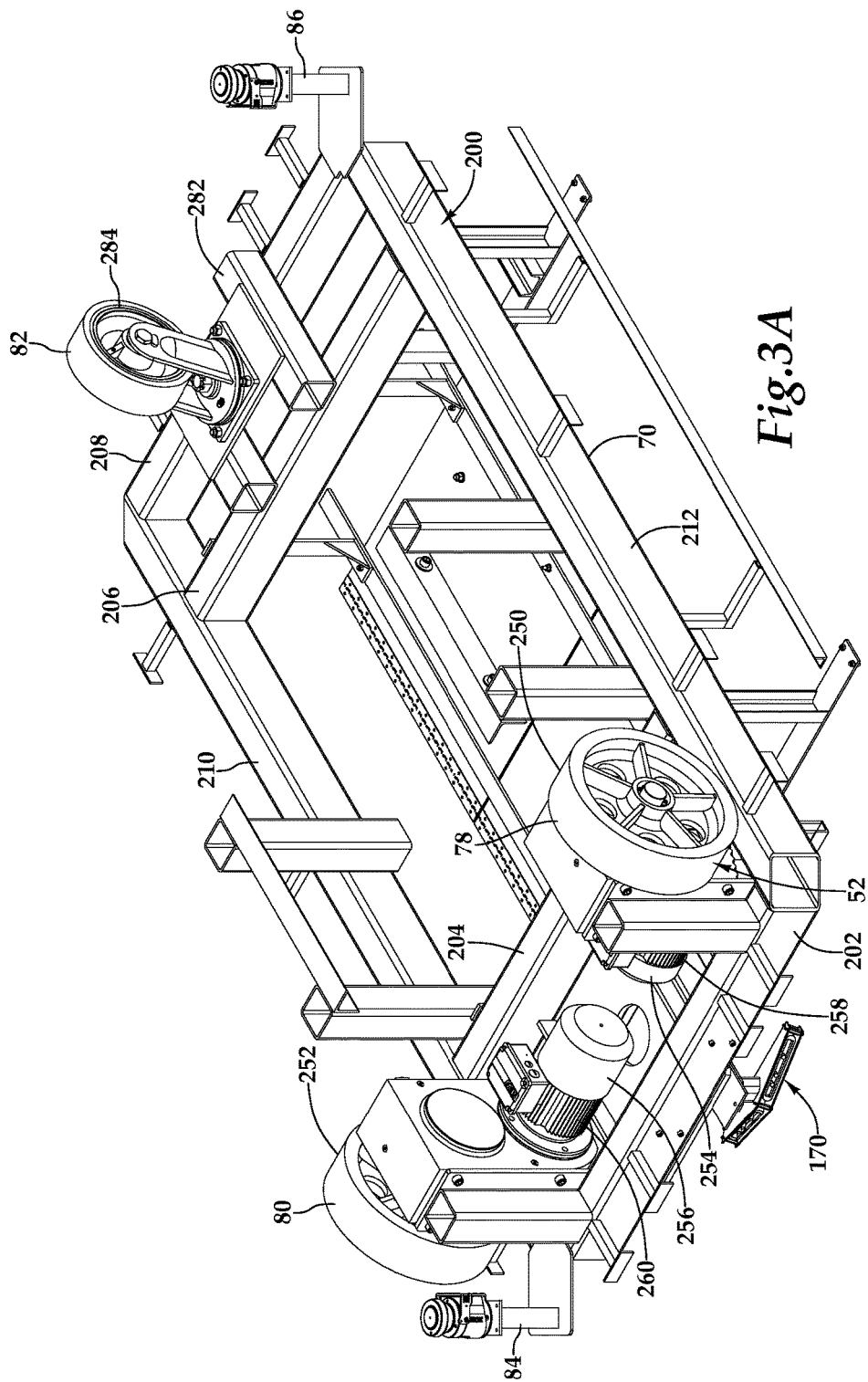
FIG. 3A is a perspective view of a portion of the automatic tire loader of FIG. 1 and in particular a detailed view of one embodiment of a mobile base.
Figure 3B:
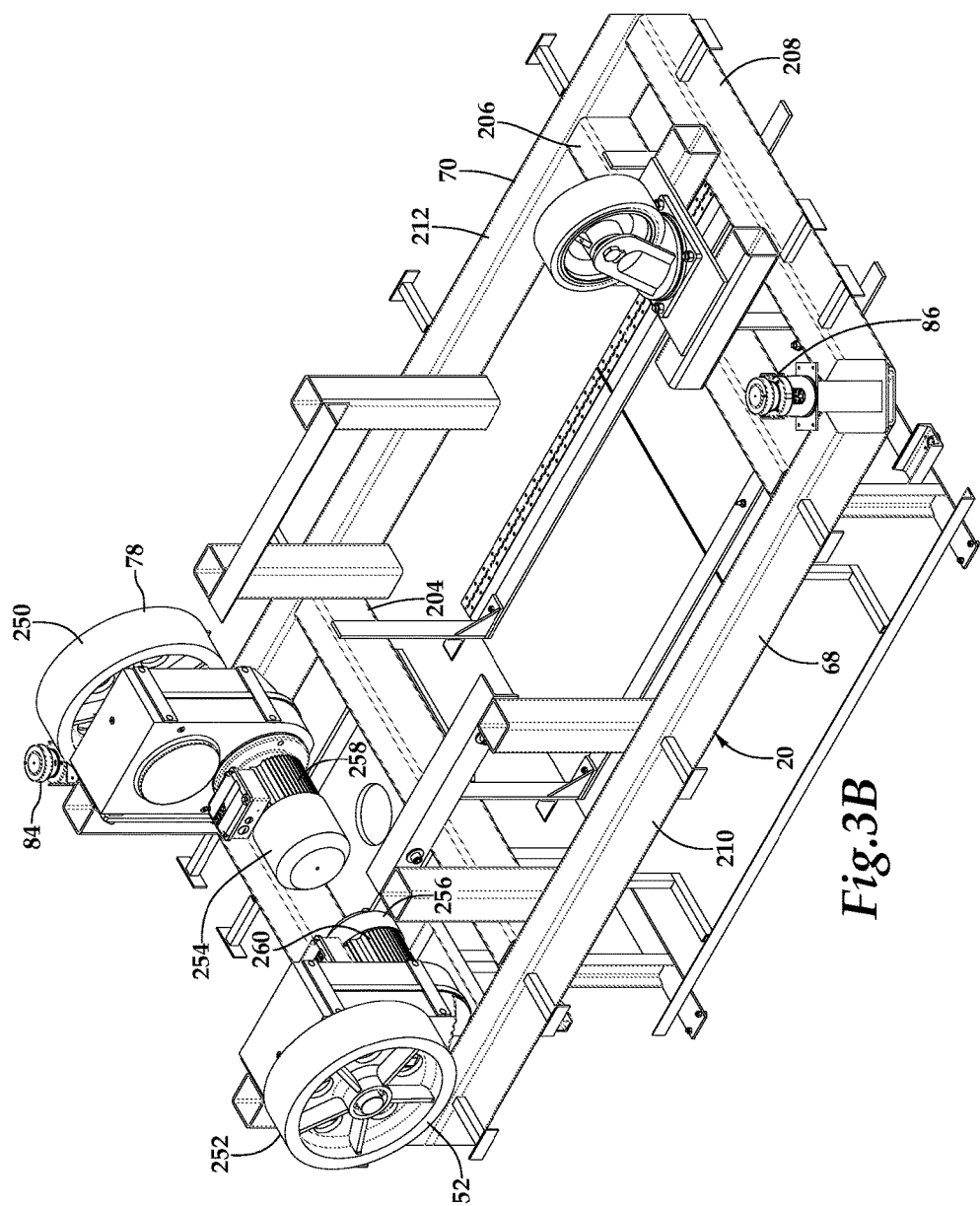
FIG. 3B is a second perspective view of the mobile base illustrated in FIG. 3A.

In one implementation, the industrial robot 56 includes seven segments 130, 138, 140, 142, 144, 146, 148 joined by six joints 150, 152, 154, 156, 158, 160 to furnish selective articulated movement having six degrees of freedom. More particularly, the referenced reachable space 132, as best seen in FIGS. 2F and 2G, is defined by the movement of the industrial robot 56 which provides rotation about six axes including rotary movement of the entire industrial robot 56 about a primary vertical axis; rotary movement of segment 146 having a tower structure about horizontal axis to provide extension and retraction of the segment 144 having a boom arm; rotary movement of the boom arm about the horizontal axis to provide raising and lowering of the boom arm; and selective rotary movement about three wrist axes.

The positioning subassembly 58 is dispersed throughout the mobile base 50. A distance measurement subassembly 170 disposed at the front end 64 of the mobile base 50 measures distance and determines the presence of objects within a detection space 172 which is located in front of the front end 64. In one embodiment, the detection space 172 and the reachable space 132 at least partially overlap. The distance measurement subassembly 170 assists the automatic tire loader/unloader 10 with forward and reverse movement and the repositioning of the automatic tire loader 10 to create additional empty reachable space 132 for the placement of the product 46. Further, the distance measurement subassembly 170 assists with the coordination and operation of the industrial robot 56. Distance and measurement information gathered by the distance measurement subassembly 170 is provided to the control subassembly 62.

As will be discussed in further detail hereinbelow, the distance measurement subassembly 170 may be a laser range finding apparatus operating on a time-of-flight measurement basis or principle, or a three-dimensional camera system, for example. It should be appreciated, however, that other types of distance measurements are within the teachings of the present invention. By way of example, and not by way of limitation, the distance measurement subassembly may include a laser range finding apparatuses, ultrasonic measurement apparatuses, inclinometers, camera systems, and combinations thereof. Similar to distance measurement subassembly 170, distance measurement subassemblies 174, 176 are respectively disposed at the sides 68, 70 and, depending on the application, may or may not be required. The distance measurement subassemblies 174, 176 each include detection spaces (not illustrated) to provide measurement and distance information to the control subassembly during traverse movement operations of the automatic tire loader/unloader 10.

The safety subsystem 60 is distributed and mounted to the mobile base 50. The safety subsystem 60 may include a light tower which provides a quick indication of the current status of the automatic tire loader/unloader 10 to an operator and a wireless operator alert system 182 which contacts pagers or cellular devices of individuals through a wireless network. Also a cage and railing may be included around the operator platform 40 to provide additional safety to the operator. Emergency buttons may be located throughout the automatic tire loader/unloader 10 to provide for instant and immediate power down. Front safety bumpers or, alternatively, scanners 188 and rear safety scanners 190 may be positioned at the front end 64 and the rear end 64 to protect the automatic tire loader/unloader 10, people, and product during a collision with an obstacle. Additionally, the front safety scanners 188 and the rear safety scanners 190 may include detectors that detect the presence of an object and cause an automatic power down during a collision. Side safety bumpers, although not illustrated, may also be utilized. It should be appreciated that other safety features may be integrated into the automatic tire loader/unloader 10.

The control subassembly 62, which is also distributed and mounted to the mobile base 50, may include control station having a user interface disposed at the side 70 near the rear of the mobile base 76. As discussed, the drive subassembly 52, the conveyance subassembly 54, the industrial robot 56, the positioning subassembly 58, and the safety subassembly 60 are interconnected and in communication with the control subassembly via a network of concealed and sheathed cables and wires. With this arrangement, the control subassembly 62 may coordinate the manual and automatic operation of the automatic tire loader/unloader 10.

A main frame 200 is constructed of welded steel tubing includes tubular sections 202, 204, 206, and 208 which provide a rectangular framework. The tubular sections 202-208 are supported by tubular sections 208, 210, 214, 216, 218, and 220, which augment and further support the rectangular framework. All mounting plates, such as mounting plates 222, 224 and bolt holes necessary to hold the various components attached to the mobile base 50 are included in the main frame 200. The large plates 222, 224 hold, for example, the control station and the user interface in position while providing counter weight for the automatic tire loader/unloader 10 as well as balance with respect to the industrial robot 56 disposed proximate to the mounting plates 222, 224. Additional counter weight may be supplied by tractor weights mounted proximate to the rear end 66, which also serve to add additional support and integrity to the main frame 200.

Drive wheel assemblies 78, 80 include a pair of front drive wheels 252, 250 disposed proximate to the front end 64 and, more particularly, proximate the intersection of tubular sections 208, 214 and tubular sections 204, 214, respectively. Respective AC motors 254, 256 with double reduction gearboxes 258, 260 supply power thereto. The AC motor 254 with double reduction gearbox 258 is disposed adjacent to the tubular section 214 and the front drive wheel 250. Similarly, the AC motor 256 with double reduction gearbox 260 is disposed adjacent to the tubular section 214 and the front drive wheel 252. The universal wheel assembly 82 includes a rear steering wheel 284 mounted to a frame 286 disposed proximate to the rear end 66.

With reference to the operation of the drive subassembly 52 in conjunction with the mobile base 50, the drive wheel assemblies 78, 80 and universal wheel assembly 82 provide mobility along the length of the automatic tire loader 10. The AC motors 254, 256 with the respective double reduction gearboxes 258, 260 drive the front drive wheels 250, 252. In particular, each front drive wheel 250, 252 is independently driven to provide the ability to turn and to provide a pivoting drive mode. The universal wheel assembly 82 provides a rear steering wheel 284 to provide enhanced steering capability for the automatic tire loader 10. In addition to providing forward and reverse capability, the one embodiment, the drive subassembly 52 may furnish a traverse drive system providing the capability to move the entire automatic tire loader 10 perpendicular to a trailer or fixed object at the loading dock 32.

Referring now to FIGS. 4A through 4C and FIGS. 5A through 5C, wherein an end effector 130 having gripper arm 134 with opposing grapplers 136A, 136B is depicted positioned to grip a tire 46 in FIGS. 4A through 4C and is actively gripping a tire in corresponding FIGS. 5A through 5C. More particularly, the end effector 130 includes a support frame 300 for attachment to the industrial robot 56 and the support frame 300 includes housings 302, 304 having guide tracks 306, 308 radially offset and spaced apart. Retaining elements 310, 312 are mounted to the support frame 300 and include respective tire contacting surfaces 314, 316 configured to contact the tire 46. Selectively moveable elements 318, 320 are mounted on the respective guide tracks 306, 308 for transverse movement along the housings 302, 304 of the support frame and superposed extension and retraction thereabove to provide for the action of the opposing grapplers 136A, 136B. The selectively moveable elements 318, 320 include deviated contact plates 322, 324 configured to contact the tire 46 at an inner radius. In operation, by extension and retraction of the opposing grapplers 136A, 136B the tire 46 may be gripped at the inner radius and released.

FIGS. 6A through 6D depict one operational embodiment of the automatic tire loader 10 stacking tires 46A-46G in the trailer of the truck. Referring now to FIG. 6A, tires 46A-46G are positioned in an empty trailer of the truck in a rick-rack stacking pattern by the automatic tire loader/unloader 10. More specifically, the distance measurement subassembly 170 continuously determines the position of the automatic tire loader/unloader 10 within the trailer and the presence of objects, including tires 46, is known. When beginning a rick-rack pattern, the automatic tire loader/unloader 10 identifies an empty tire skyline 330 and chooses an active quadrant 332 to begin stacking operations. A sequential tire placement direction 334 is also identified such that the active quadrant 332 advances horizontally across the trailer 16 of the truck. Initially, within the active quadrant 332, a placement angle α is specified for the placement of the first tire 46A. Thereafter, for tires 46B-46G, placement angles α are determined and the automatic tire loader/unloader 10 with the use of the end effector 130 places the tires 46B-46G, where as shown tire 46G is being placed.

With reference to FIG. 6B, with the first row of tires 46A-46G complete, the tire skyline 330 is identified and within the tire skyline 330 a hole and a bump of an adjacent tire pair is identified. For example, hole 336 and bump 338 of tires 46A, 46B is identified to determine tire 46M should be placed adjacent to tire 46L and superposed on tires 46A, 46B. With reference to FIG. 6C, this methodology continues with the skyline 330 and activity in quadrant 332, from which the sequential placement direction 334 will advance. The hole 336 is identified with tire 46M and the side wall 20B of the trailer 16 serves as the bump for placement of the tire 46N. The sequential tire placement continues until the trailer of the truck is filled as shown in FIG. 6D, with 3A tires, 46A-46Z and 46AA-46MM.

Figure 7A:
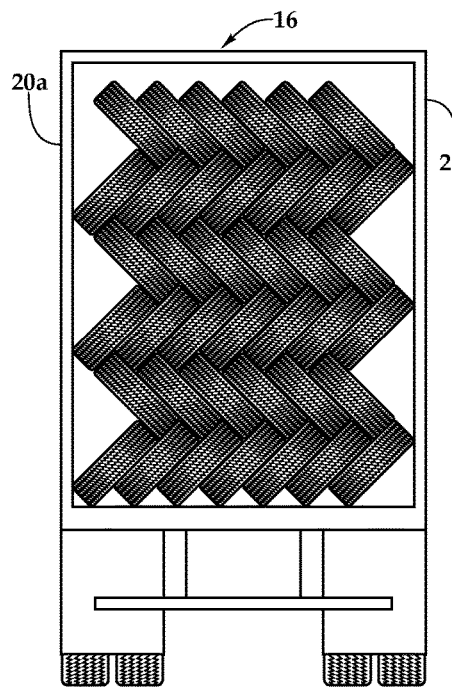
FIGS. 7A through 7D are schematic diagrams of one operational embodiment of the automatic tire loader of FIG. 1 unstacking tires in the trailer of the truck.
Figure 7B:
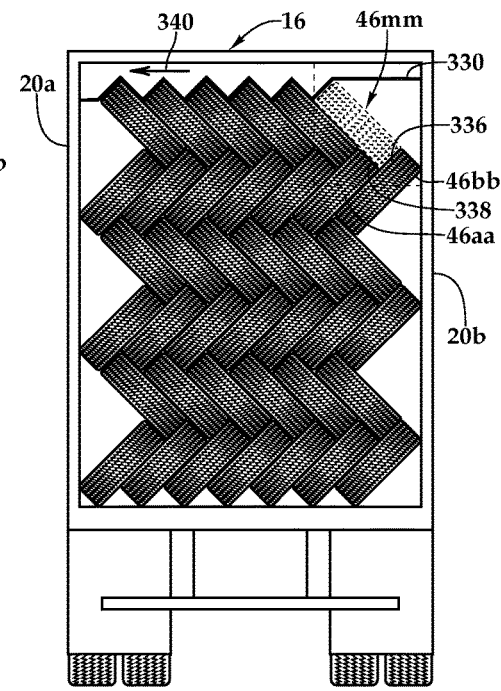
Figure 7C:
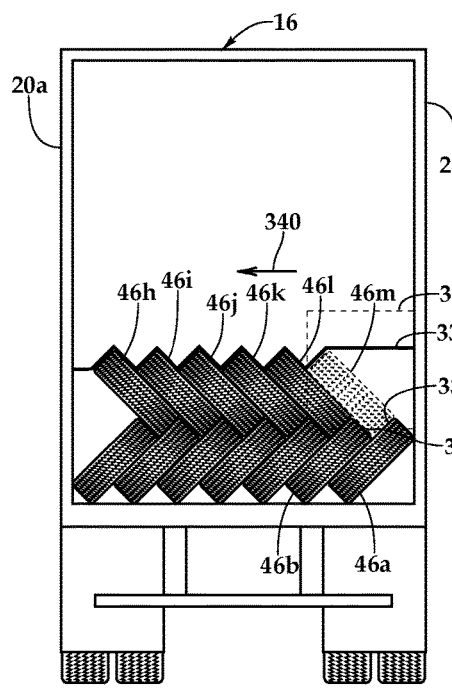
Figure 7D:
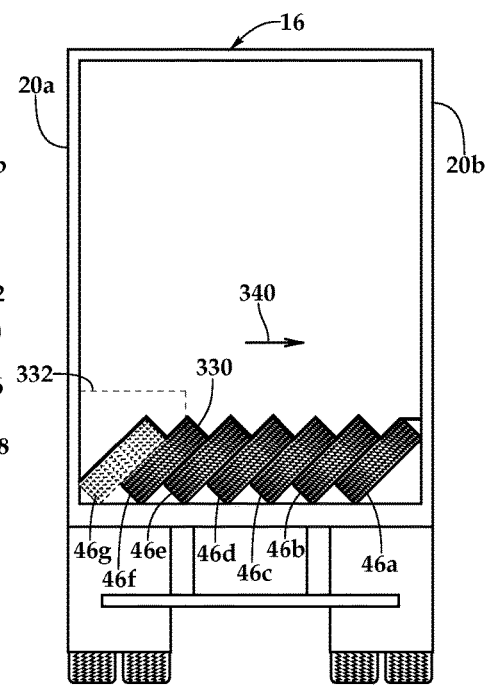

FIGS. 7A through 7D depict one operational embodiment of the automatic tire loader 10 unstacking tires in the trailer 16 of the truck. In FIG. 7A, the unstacking methodology begins by the identification of the tire skyline 330 and the active quadrant 332 from which sequential tire removal will advance as identified by number 340. Bump 338 and hole 336 of the adjacent tire pair are identified and as shown in FIG. 7B, the tire 46MM is removed following the automatic tire loader/unloader 10 providing the appropriately calculated instructions for removing tires from the rick-rack pattern. This methodology continues in FIGS. 7C and 7D, wherein upon reaching the bottom row, the automatic tire loader/unloader sequentially removes the last row of tires 46A-46G.

Figure 8A:
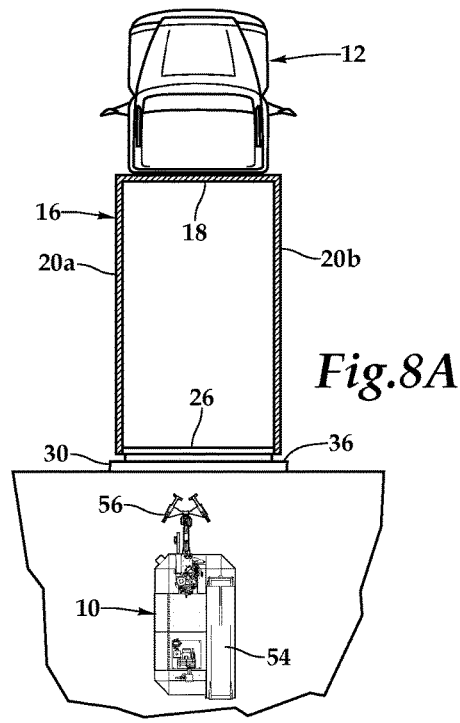
FIGS. 8A through 8D are top plan views of an operational embodiment corresponding to FIGS. 6A through 6D.

Referring now to FIGS. 8A through 8D, wherein one embodiment of an automated tire loading system and methodology are illustrated for the automatic tire loader/unloader 10 of the present invention. Initially, as shown in FIG. 8A, the trailer 16 is positioned under the power of the tractor trailer 12 at the loading bay 30 of the loading dock 32 approximate to the deck 38 where the automatic tire loader/unloader 10 is working. The trailer 16 is set-up, cleaned, and activated in a usual manner. The dock plate 36 is deployed from the loading bay 30 into the trailer 16 to provide a bridge. Thereafter, the trailer 16 is inspected for significant damage that may interfere with the automated loading operations of the automatic tire loader/unloader 10. Additional inspection may include ensuring the trailer is reasonably centered within the loading bay 30 and ensuring the deck 38 is clear of any obstructions. At this time, by way of further safety measures, a kingpin lockout may be installed to prevent a driver from accidentally pulling out the trailer 16 from the loading bay 30 when the automatic tire loader/unloader 10 is operating within the trailer 16. The kingpin lockout or similar safety precautions protect both the operator 40 and the equipment and ensures that the wheels of the trailer 16 are chocked and will not roll during the use of the automatic tire loader 10.

Continuing to refer to FIG. 8A, once the trailer 16 is positioned in the loading bay 30, the automatic tire loader/unloader 10 is moved in front of the rear access opening of the trailer 16. The automatic tire loader/unloader 10 utilizes either a manual or automatic reverse mode to assist the operator (whether on the automatic tire loader/unloader 10 or at a remote location) in backing the automatic tire loader/unloader 10 up to the telescoping conveyer unit 42 in a position that is square thereto. The conveyance subassembly 54 of the automatic tire loader 10 is then coupled to the telescoping conveyor unit 42. At this time, as the dock plate 36 has been positioned from the deck 38 to the trailer 16, the automatic tire loader/unloader 10 may be advanced into the interior of the trailer 16.

With reference to FIG. 7B, the automatic tire loader/unloader 10 has advanced forward into the trailer 16 and, in one embodiment, the positioning subassembly 58 and, in particular, the distance measurement subassembly 170 continuously determines the position of the automatic tire loader/unloader 10 within the trailer 16. More specifically, several measurements are made. The position and angle of the automatic tire loader/unloader 10 are measured with respect to the sidewalls 20A, 20B and an interior width defined thereby. Also, measurements are made with respect to a near wall within the trailer 16 and the floor 22. The near wall being the closer of the front wall 18 of the trailer or the edge formed by product 46, e.g. tires, positioned within the trailer 16. The angle relative to the floor 22 proximate to the automatic tire loader/unloader 10 is measured as the automatic tire loader/unloader traverses the dock plate 36 and moves into the trailer 16. In one embodiment, following successful traversal, the angle relative to the floor 22 may be assumed to be constant.

In this way, as the automatic tire loader/unloader 10 moves, the position of the automatic tire loader/unloader 10 relative to objects in its environment, including tires, is known and the automatic tire loader 10 may adjust operation appropriately. Adjustments in operation may include, but are not limited to, the operation of the industrial robot 56, the operation of the conveyance subassembly 54, and the actuation of the drive subassembly 52. The position of the sidewalls 20A, 20B and the near wall is utilized to determine the position of the automatic tire loader 10 along the length of the trailer 16, the position across the width of the trailer 16, and the automatic tire loader's angle relative to the sidewalls 20A, 20B or yaw. The measurements also determine the position of the automatic tire loader/unloader 10 relative to the floor 22 of the trailer 16. To assist the automatic tire loader/unloader 10 in determining position within the trailer 16, in one implementation, the automatic tire loader/unloader 10 is programmed with the dimensions of the trailer 16.

Additionally, in one embodiment, the automatic tire loader/unloader 10 is programmed with the reachable space 132 of the industrial robot 56. As illustrated, once the automatic tire loader/unloader is positioned proximate to the front wall 18 of the trailer 16 such that the placement of tires 46 against the front wall 18 of the trailer 16 is within the reachable space 132 of the industrial robot 56, the automatic tire loader/unloader 10 stops advancing. Continuing to refer to FIG. 8B, tires 46 are conveyed from the telescoping conveyor unit 42 to the conveyance subassembly 54 and this stream of tires 46 is presented to the industrial robot 56. With selective articulated movement through the reachable space 132, the industrial robot 56 places the tires 46 within the trailer and sequentially loads the tires 46 according to a stacking routine designed to optimize the use of available space within the trailer 16. For example, the stacking routine may be the rick-rack stacking pattern presented in FIGS. 6A through 7D or vertically stacked tires.

Figure 8B:
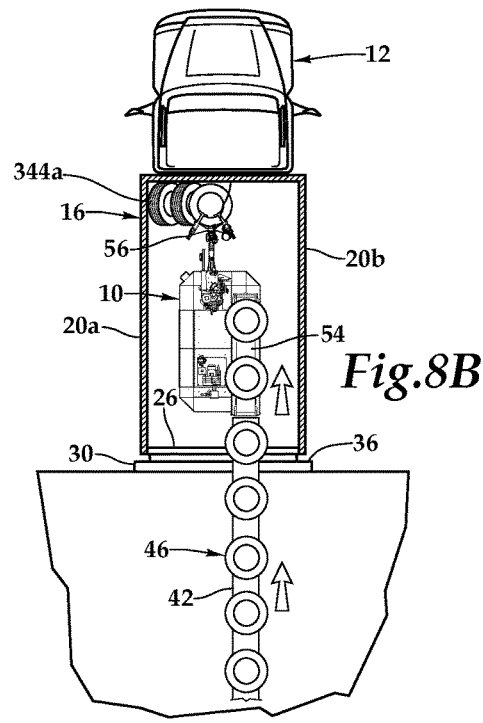

In the illustrated embodiment, this stacking routine places product in sequentially rick-rack stacked rows. By way of example, FIG. 8B illustrates a first rick-rack stacked row 344A being completed. This stacking routine or other alternative stacking routine may be optimized for the size of the end effector 130 of the industrial robot 56, the dimensions of the trailer 16, and the dimensions of the product 46.

Figure 8C:
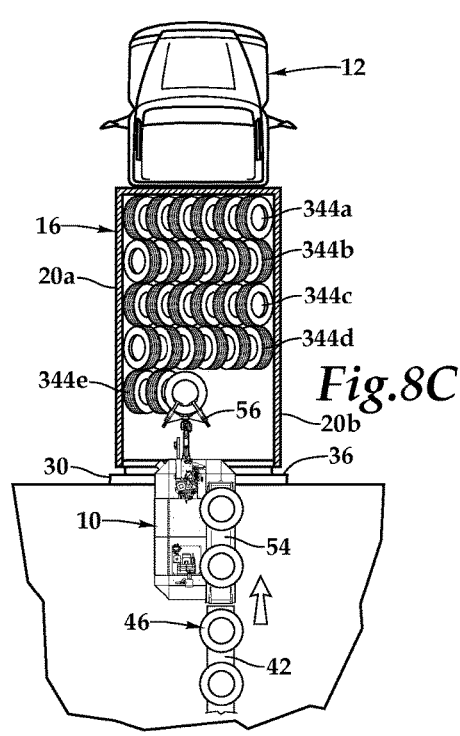

As depicted in FIG. 8C, the automatic tire loader/unloader 10 has completed stacking multiple horizontal rows 344A-344D of tires 46. The loading of the tires 46 by the industrial robot 56 is temporarily interrupted in response to the distance measurement subassembly 170 detecting the presence of the tires 46 within the reachable space 132. Further, with this information being available to the control subassembly 62, a signal may be sent to the conveyance subassembly 54 to slow down or temporarily halt the powered transport of the product 46.

As a result of the completion of a row, such as rows 344A-344D, the automatic tire loader/unloader 10 periodically reverses and repositions to refresh the reachable space 132 such that the automatic tire loader/unloader 10 is positioned proximate to the wall of placed tires 46 in order that the placement of additional tires 46 against the wall of placed tires 46 is within the reachable space 132 of the industrial robot 56. During the repositioning of the automatic tire loader/unloader 10, the telescoping conveyor unit 42 appropriately retracts, while maintaining contact with the conveyance subassembly 54, to accommodate the new position of the automatic tire loader/unloader 10.

Figure 8D:
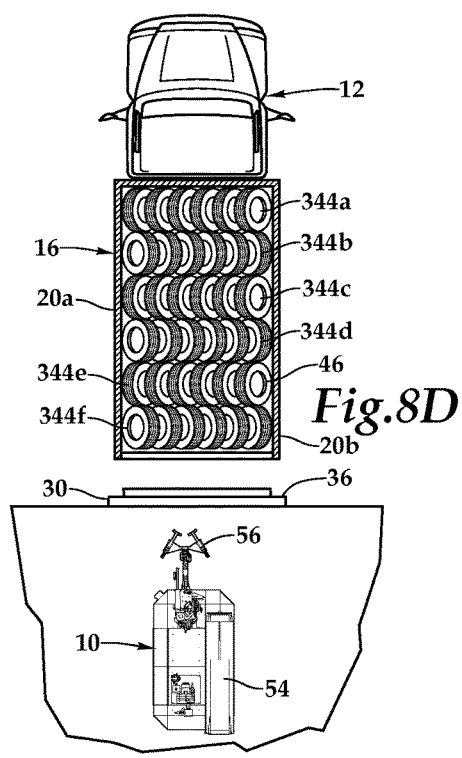

Referring to FIG. 8D, the iterative stacking operations and repositioning of the automatic tire loader/unloader 10 described in FIGS. 8A through 8C continues and the trailer 16 is filled. With respect to FIG. 8D, the trailer 16 is completely filled with tires 46, including rows 344A-344F, and the automatic tire loader 10 is reversed to a position entirely on the deck 38. Thereafter, the trailer 16 filled with tires may leave the loading dock 32 and a fresh empty trailer may then be positioned at the loading bay 30 and loaded in the manner described herein.

FIGS. 9A through 9D depict the iterative unstacking operations and repositioning of the automatic tire loader/unloader 10. As shown, the automatic tire loader/unloader 10 unstacks tires 46 from the filled trailer having rows 344A-344I in a manner opposite to that described in FIGS. 8A through 8D until the trailer 16 is empty in FIG. 9D.

Figure 10:
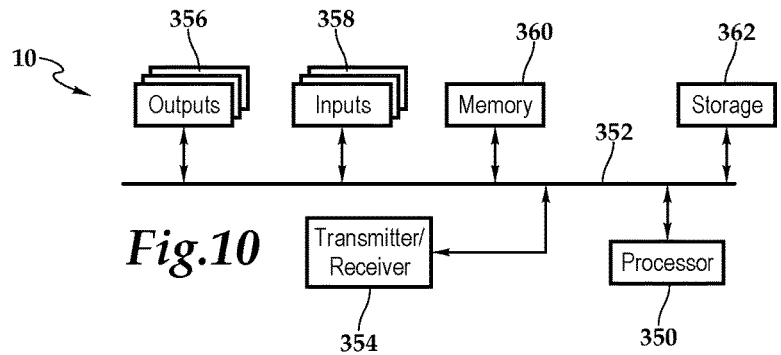
FIG. 10 is a schematic block diagram of one embodiment of the automatic tire loader.

FIG. 10 depicts one embodiment of the automatic tire loader/unloader 10 in which the automatic tire loader/unloader is schematically depicted to include a computer-based architecture including a processor 350 coupled to a bus 352 having transmitter/receiver circuitry 354, outputs 356, inputs 358, memory 360, and storage 362 interconnected therewith. In one embodiment, the control assembly 192 includes the memory 360, which is accessible to the processor 350. The memory 360 includes processor-executable instructions that, when executed cause the processor 350 to execute instructions for stacking or unstacking tires 46 or other objects. By way of example and not by way of limitation, the instructions may be directed to stacking tires in a rick-rack or vertical pattern or unstacking tires from a rick-rack or vertical pattern. With respect to stacking tires in a rick-rack pattern, the instructions may include specifying a search operation to identify a tire skyline including an active quadrant, specifying a search operation to identify a hole and hump of an adjacent tire pair within the active quadrant, specifying a search operation to identify the sequential tire placement direction, and the calculation of instructions for executing a rick-rack stacking pattern of tires.

Other types of tire stacking/unstacking operations involve other types of instructions. Removing tires, whether from a rick-rack or vertical stack, requires a search operation to identify the sequential tire removal direction. Further, operations may specify instructions for executing a rick-rack unstacking pattern of tires, instructions for executing a vertical stacking pattern of tires, or instructions for executing a vertical unstacking pattern of tires, for example. It should be appreciated that although a specific computer architecture is depicted in FIG. 10, other architectures are within the teachings presented herein.

Figure 11:
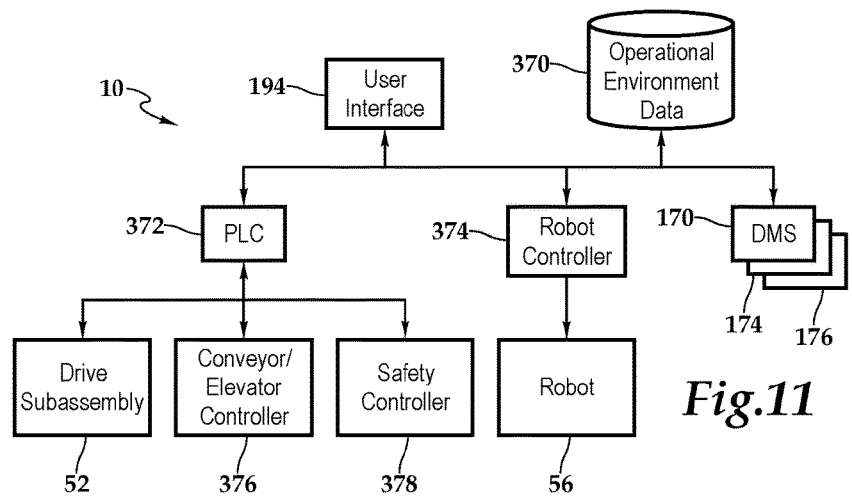
FIG. 11 is a schematic block diagram of one embodiment of the automatic tire loader in additional detail.

FIG. 11 depicts one embodiment of the automatic tire loader/unloader 10 and the control signals associated therewith, which may be deployed across the computer architecture shown in FIG. 10, for example. The illustrated components coordinate the various functions and operations of the automatic tire loader/unloader 10. The user interface 194, operational environment database 370, programmable logic controller 372, robot controller 374, and distance measurement subassemblies 170, 174, 176 are interconnected. The drive subassembly 52, conveyance subassembly 54, as represented by control 376 for conveyors/elevators, and safety controller 378 are connected to the programmable logic controller 372. Finally, the industrial robot 56 is connected to the robot controller 374. In one implementation, the user interface 194, operational environment database 370, and programmable logic controller 372 are part of the control subassembly 62 and the robot controller 374 forms a portion of the industrial robot 56. The safety controller 358 is included in the safety subsystem 60 and provides operation to the aforementioned components of this subsystem.

The user interface 194 provides user control and interaction with the automatic tire loader/unloader 10. The user interface 194 may utilize icons in conjunction with labels and/or text to provide navigation and a full representation of the information and actions available to the operator. In addition to loading operations, user interactions may be related to maintenance, repair and other routine actions which keep the automatic tire loader 10 in working order or prevent trouble from arising.

The operational data environment database 370 includes data about the reachable space 132 of the industrial robot 56, stacking methodology data, product information as well as information about the standard sizes of trailers. The product information may be stored in the operational data environment database 350, gathered by the conveyance subassembly 54 as previously discussed, or gained by a combination thereof. By having the standard sizes of trailers pre-loaded, operator time is saved from having to enter this data and performance of the automatic tire loader/unloader 10 is improved with this additional information. By way of example, Tables I & II present exemplary examples of type of trailer data that the automatic tire loader/unloader 10 may utilize in determining position and product placement.

TABLE I

TRAILER DIMENSIONS

| Trailer Type | Length | Inside Width | Inside Height Center | Inside Height Front | Door Opening Width |
|---|---|---|---|---|---|
| 28' (8.5 m) High Cube | 27'3" (8.3 m) | 100" (2.5 m) | 109" (2.8 m) | 107" (2.7 m) | 93" (2.4 m) |
| 45' (13.7 m) Wedge | 44'1½" (13.4 m) | 93" (2.4 m) | 109" (2.8 m) | 106" (2.7 m) | 87" (2 m) |
| 48' (14.6 m) Wedge | 47'3" (14.4 m) | 99" (2.5 m) | 110½" (2.8 m) | 108½" (2.8 m) | 93" (2.4 m) |

TABLE II

TRAILER DIMENSIONS CONTINUED

| Trailer Type | Door Opening Height | Rear Floor Height | Cubic Capacity | Overall Width | Overall Height |
|---|---|---|---|---|---|
| 28' (8.5 m) High Cube | 104" (2.6 m) | 47½" (1.2 m) | 2029 cft (57.5 cm) | 102" (2.6 m) | 13'6" (4.1 m) |
| 45' (13.7 m) Wedge | 105½" (2.7 m) | 50" (1.3 m) | 3083 cft (7.3 cm) | 96" (2.4 m) | 13'6" (4.1 m) |
| 48' (14.6 m) Wedge | 105" (2.7 m) | 48½" (1.2 m) | 3566 cft (101 cm) | 102" (2.6 m) | 13'6" (4.1 m) |

The programmable logic controller 372 coordinates overall operation and switches between various modes of operation including manual and automatic. The programmable logic controller 372 also provides for the high-level calculation and coordination required during automatic operation for items such as the current loading/unloading quadrant and steering angel calculations during automatic navigation.

The robot controller 374 controls the motions of the industrial robot 56 through built in inputs and outputs wired through the industrial robot 56 and the end effector 130. It should be appreciated that although a particular architecture is presented for the control of the automatic tire loader, other architectures are within the teachings of the present invention. By way of example, any combination of hardware, software, and firmware may be employed. By way of further example, the distribution of control may differ from that presented herein.

In one operation embodiment, the programmable logic controller 372 accesses the dimensions of the trailer 16 from the operational environment database 372. The operator 40 has indicated through the user interface 194 which type of trailer has arrived at the docking bay 30. Alternatively, the distance measurement subassembly 170 is operable to detect this information. The distance measurement subassembly, which may include various components 170, 174, 176, relays distance and position data to the programmable logic controller 352 which uses this information to send control signals to the robot controller 374, the drive subassembly 52, the controller 372, and the safety controller 378. Additionally, the programmable logic controller 372 receives control signals, which are inputs into the behavior process, from each of these components. Constant updates and status information are provided to the operator 40 by the programmable logic controller 352 through the user interface 194.

Figure 12:
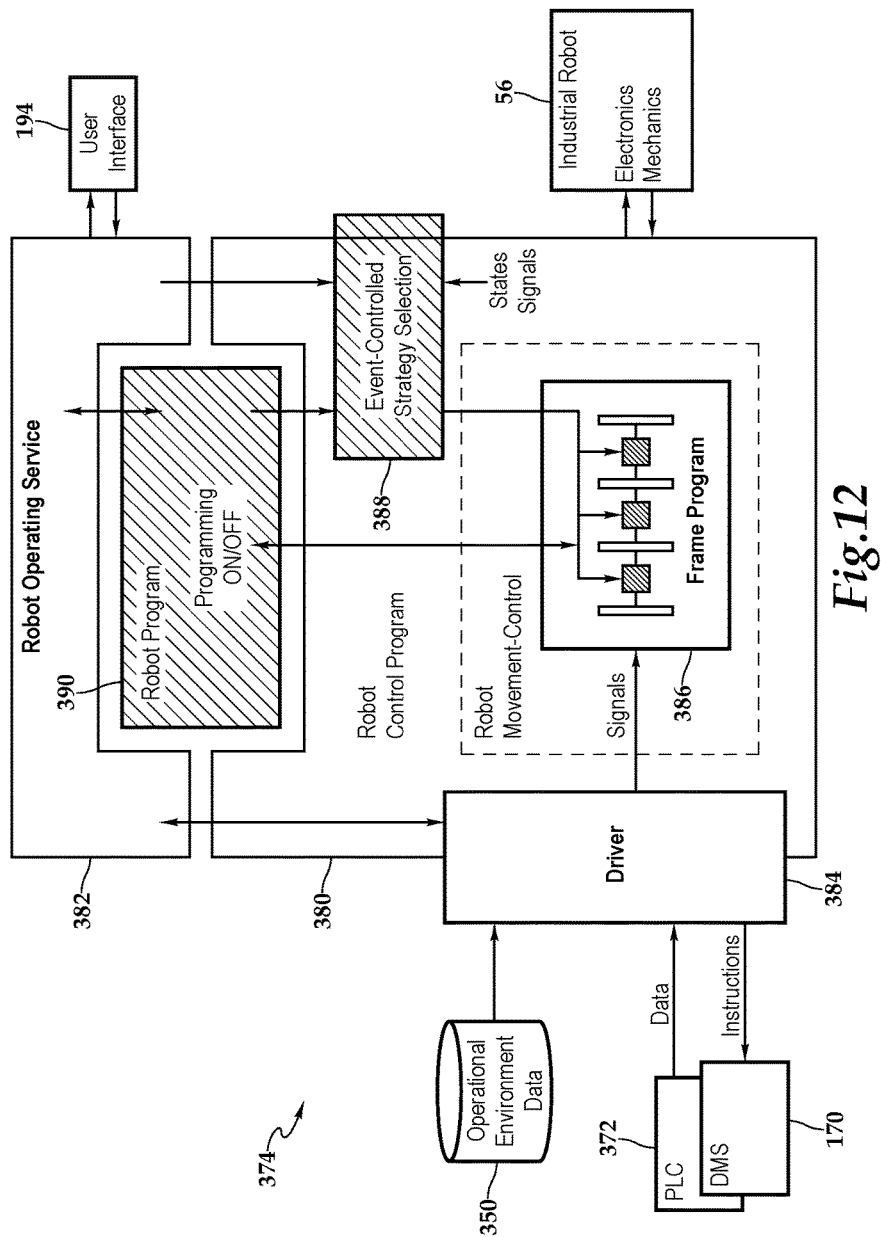
FIG. 12 is a schematic diagram of one embodiment of a robot controller which forms a portion of the automatic tire loader.

FIG. 12 depicts one embodiment of the robot controller 372 which forms a portion of the automatic tire loader 10. The essence of the robot control 372 is a robot system or control program 380, which controls the industrial robot 56. The control program 380 can be operated by the operator 40 by means of an operating service 362 in communication with the user interface 194 and receives input data (as well as provide instructions, as appropriate) from the operational environmental database 370, programmable logic controller 372, and distance measurement subassembly 170 by means of a driver 384. It should be appreciated, that the independence of the robot controller 374 may vary. In one implementation, the robot controller 374 may be under the control of the programmable logic controller 374. In another implementation, as illustrated, the robot controller 374 is more autonomous and may include features such as direct connection to the user interface 194.

According to one embodiment, between the driver 384 and the control program 380 is provided an independent data processing layer in the form of a frame program 386, which controls the robot movements, and a unit 388 for automated or event-controlled strategy or behavioral selection on the basis of the states and signals which occur. User application programs, event-controlled strategy selections and sensor programs in the frame program 386 can be programmed by the operator 40 and directed by a robot program 390, which monitors the balance and implementation of manual and automatic control of the industrial robot 56.

Figure 13:
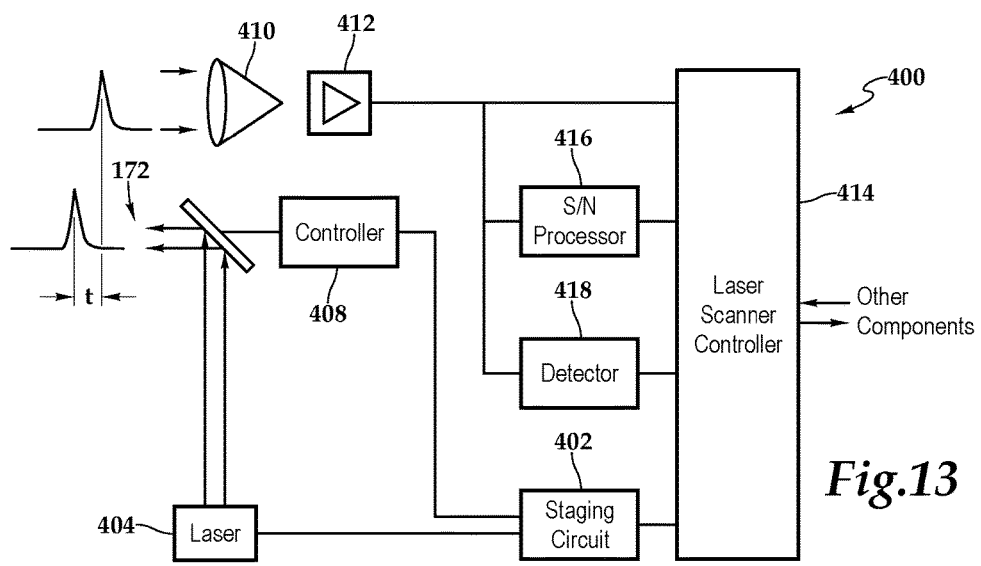
FIG. 13 is a schematic diagram of one embodiment of a distance measurement subassembly which forms a component of the automatic tire loader.

FIG. 13 depicts one embodiment of a distance measurement subassembly, i.e., a laser measurement sensor 400. A staging circuit 402 causes a pulsed laser 404 to transmit light pulses while causing the rotation of a light deflecting device 406 via controller 408 which may be equipped with a rotational means and a motor. The angular position of the light deflecting device 406 is continuously communicated to the staging circuit 402 by the controller 408. Light pulses are transmitted into the detection space 172 via the transmitter lens and the mirrors associated with the light deflection device 406. More particularly, when the rotary mirror of the light deflection device 406 is driven by the controller 408 to execute a continuous rotary movement, the staging circuit 402 causes the pulsed laser 404 to transmit a light pulse. The light pulse is transmitted into the detection space 172 and is reflected from an object, so that finely a received pulse enters into a photo receiving arrangement 410. In this manner the light reaches the photo receiver arrangement 410 after a light transit time t of 2d/c, where d is the space in the object from the apparatus and c is the speed of light.

The time t between the transmission and reception of the light pulse is measured with the aid of a comparator 412 having time interval computer functionality. On transmitting the light pulse, a counter function within the comparator 412 is triggered and is stopped again by the photo receiver arrangement 410 via the comparator 412 on receiving the light pulse from the detection space 172.

A corresponding electrical signal is formed and applied via comparator 412 to a laser scanner controller 414, signal to noise processor 416 and a detector 418, which analyzes the signal for objects and in the instant example determines that an object is present. The task of the signal to noise processor 416 is to control the detection threshold independence on the received noise level. This control ensures a constant false alarm rate with varying illumination situations and object reflection factors. The signal to noise processor 416 makes available this information to the laser scanner controller 414. The laser scanner controller 414 performs peak value calculations based on the data from the comparator 412, the signal to noise processor 416, and the detector 418.

As the laser scanner controller 414 knows the instantaneous angular position of the light pulses by way of communication with the staging circuit 402, the laser scanner controller 414 determines the location of the object and other navigational properties. The laser scanner controller 414 is adapted to forward this information to other components.

Figure 14:
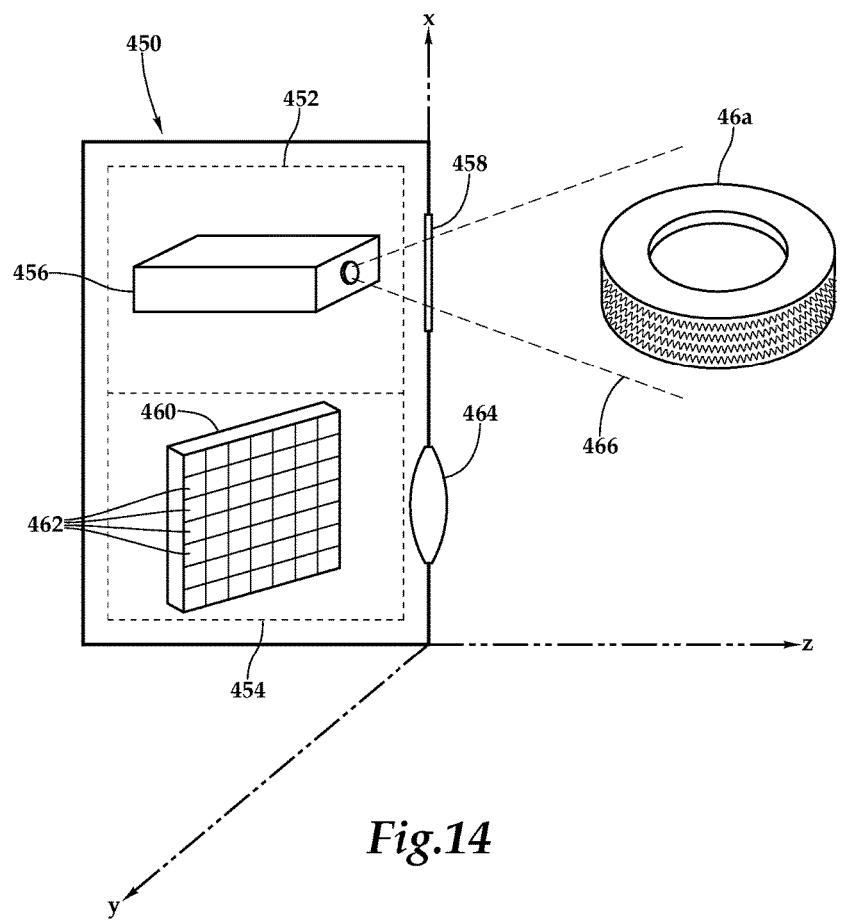
FIG. 14 is a schematic diagram of another embodiment of a distance measurement subassembly which forms a component of the automatic tire loader.

FIG. 14 is a schematic diagram of a distance measurement subassembly 170, which is depicted as a three dimensional (3-D) measurement system 450, which includes an illumination assembly 452 and an image capture subassembly 454 that together utilize a laser and/or infrared-based camera application employing an adaptive depth principle. The illumination assembly 452 includes a light source 456 and a transparency 458, which may include a positive image on a transparent support with a various sorts of fixed, uncorrelated patterns of spots, for example.

The light source 456 transilluminates transparency 458 with optical radiation so as to project an image of the spot pattern that is contained by the transparency onto object 46A, which is depicted as the tire, but may also include various environmental information about the storage container. The image capture assembly 454 captures an image of the pattern that is projected by illumination assembly 452 onto tire 46A. The image capture assembly 454 may include objective optics 464, which focus the image onto an image sensor 460. Typically, the image sensor 460 includes a rectilinear array of detector elements 462, such as a CCD or CMOS-based image sensor array.

As should be appreciated, although the illumination assembly and image capture assembly are shown as held in a fixed spatial relation, various other positioning techniques may be employed to create a dynamic relationship therebetween. Moreover, the three-dimensional x, y, z axis may be employed in this regard. To generate a 3D map of object or tire 46A, including the environment, a processor, which may incorporated into processor 350 or associated therewith, compares the group of spots in each area of the captured image to the reference image in order to find the most closely-matching group of spots in the reference image. The relative shift between the matching groups of spots in the image gives the appropriate x, y or Z-direction shift of the area of the captured image relative to the reference image. The shift in the spot pattern may be measured using image correlation or other image matching computation methods that are known in the art. By way of example, the operation principle may include an infrared adaptive depth principle utilizing laser or infrared cameras.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A method for stacking tires within a trailer parked at a loading bay, the method comprising:
    providing an automatic tire loader/unloader including a base structure having an industrial robot mounted thereto, the industrial robot is operable to handle tires; and
    executing at the automatic tire loader/unloader a rick-rack stacking routine including processor-executable instructions to:
        specify a search operation to identify a tire skyline including an active quadrant,
        specify a search operation to identify a hole and hump of an adjacent tire pair within the active quadrant, specify a search operation to identify the sequential tire placement direction, and calculate instructions for executing a rick-rack stacking pattern of tires.

2. The method as recited in claim 1, further comprising connecting a conveyance subassembly disposed on the mobile base to a telescoping conveyor unit having a supply of tires associated therewith.

3. The method as recited in claim 1, further comprising driving the automatic tire loader/unloader into the trailer.

4. The method as recited in claim 1, further comprising detecting the location of the automatic tire loader/unloader within the trailer with a distance measurement subassembly disposed on the mobile base structure.

5. The method as recited in claim 4, further comprising stopping, in response to distance measurement data from the distance measurement subassembly, the automatic tire loader/unloader proximate to the front wall of the trailer.

6. The method as recited in claim 1, further comprising presenting a stream of tires to an industrial robot disposed on the base structure, the industrial robot providing selective articulated movement through a reachable space such that the industrial robot is operable to place the tires within the trailer.

7. The method as recited in claim 1, further comprising sequentially loading the tires within the trailer with the industrial robot according to the rick-rack stacking routine designed to optimize the use of available space within the trailer.

8. The method as recited in claim 1, further comprising interrupting the loading of tires in response to detection by the distance measurement subassembly of presence of tires within the reachable space.

9. The method as recited in claim 8, further comprising reversing and repositioning the automatic tire loader/unloader to refresh the reachable space.

10. The method as recited in claim 9, further comprising resuming the sequential loading of the tires.

11. A method for stacking tires within a trailer parked at a loading bay, the method comprising:

providing an automatic tire loader/unloader including a base structure having an industrial robot mounted thereto, the industrial robot is operable to handle tires; and executing at the automatic tire loader/unloader a rick-rack unstacking routine including processor-executable instructions to:
specify a search operation to identify a tire skyline including an active quadrant,
specify a search operation to identify a hole and hump of an adjacent tire pair within the active quadrant,
specify a search operation to identify the sequential tire placement direction, and
calculate instructions for executing a rick-rack unstacking pattern of tires.

12. The method as recited in claim 11, further comprising connecting a conveyance subassembly disposed on the mobile base to a telescoping conveyor unit to receive a supply of tires.

13. The method as recited in claim 11, further comprising driving the automatic tire loader/unloader into the trailer.

14. The method as recited in claim 11, further comprising detecting the location of the automatic tire loader/unloader within the trailer with a distance measurement subassembly disposed on the mobile base structure.

15. The method as recited in claim 14, further comprising stopping, in response to distance measurement data from the distance measurement subassembly, the automatic tire loader/unloader proximate to the front wall of the trailer.

16. The method as recited in claim 11, further comprising presenting a stream of tires to a conveyance subassembly disposed on the base structure, the industrial robot providing selective articulated movement through a reachable space such that the industrial robot is operable to remove the tires from the trailer.

17. The method as recited in claim 11, further comprising sequentially unloading the tires within the trailer with the industrial robot according to the rick-rack unstacking routine.

18. The method as recited in claim 11, further comprising interrupting the unloading of tires in response to detection by the distance measurement subassembly of absence of tires within the reachable space.

19. The method as recited in claim 18, further comprising forwarding and repositioning the automatic tire loader/unloader to refresh the reachable space.

20. The method as recited in claim 19, further comprising resuming the sequential unloading of the tires.

* * * * *